US005551545A

United States Patent [19]

Gelfman

[11] Patent Number: 5,551,545

[45] Date of Patent: Sep. 3, 1996

[54] AUTOMATIC DEPLOYMENT AND RETRIEVAL TETHERING SYSTEM

[76] Inventor: Stanley Gelfman, 1 Douglas La., Larchmont, N.Y. 10538

[21] Appl. No.: 210,514

[22] Filed: Mar. 18, 1994

[51] Int. Cl.[6] .............................. H02G 11/02; G01L 1/22

[52] U.S. Cl. ................................ 191/12.2 A; 73/862.474; 73/862.632; 73/862.56

[58] Field of Search ......................... 191/12.2 R, 12.2 A, 191/12.4; 73/862.44, 862.451, 862.46, 862.471, 862.474, 862.56, 862.57, 862.621, 862.627, 862.632

[56] References Cited

U.S. PATENT DOCUMENTS

| | | | |
|---|---|---|---|
| 2,690,884 | 10/1954 | Beck . | |
| 3,168,261 | 2/1965 | Hainer . | |
| 3,381,527 | 5/1968 | Grubbs | 73/862.474 X |
| 3,535,937 | 10/1970 | Wiggins et al. | 73/862.632 X |
| 3,650,490 | 3/1972 | Saunders . | |
| 4,102,445 | 7/1978 | Eurom | 191/12.2 R |
| 4,108,264 | 8/1978 | Tanaka | 191/12.2 A X |
| 4,458,880 | 7/1984 | Conti | 73/862.44 X |
| 4,511,100 | 4/1985 | Oetringhaus . | |
| 4,569,489 | 2/1986 | Frey et al. . | |
| 4,583,700 | 4/1986 | Tschurbanoff . | |
| 4,666,102 | 5/1987 | Colbaugh et al. . | |
| 4,692,063 | 9/1987 | Conti . | |
| 4,736,826 | 4/1988 | White et al. . | |
| 4,744,696 | 5/1988 | Vidler . | |
| 4,842,207 | 6/1989 | Kinnan . | |
| 4,897,512 | 1/1990 | Johnston | 191/12.4 |
| 5,007,599 | 4/1991 | Forsyth | 191/12.2 A X |
| 5,056,612 | 10/1991 | Roumagnac . | |

FOREIGN PATENT DOCUMENTS

| | | | |
|---|---|---|---|
| 554155 | 8/1993 | European Pat. Off. | 191/12.2 A |
| 1622192 | 1/1991 | U.S.S.R. | 191/12.2 A |
| 1766729 | 10/1992 | U.S.S.R. | 191/12.2 A |
| 8402430 | 6/1984 | WIPO | 191/12.2 A |

*Primary Examiner*—Karen B. Merritt
*Assistant Examiner*—Scott L. Lowe
*Attorney, Agent, or Firm*—Ostrolenk, Faber, Gerb & Soffen, LLP

[57] ABSTRACT

A system for a mobile vehicle such as a remotely controlled robot, for deploying and retrieving cable into the environment external to the vehicle. The system includes a frame, a cable reel mounting device for a cable storage reel having cable wound thereon for rotatable motion. A rotatable electric/fiber optic joint is provided for coupling one end of the cable to the vehicle. The device has a mechanism for feeding the cable on and off the cable storage reel and for guiding the unwound cable from the vehicle. A sensor senses the tension in the cable in any direction in an arc of 360° as the cable exits a cable exit opening. An electronic circuit receives a signal from the sensor related to the tension in the cable for controlling the feeding of cable so as to maintain a preset tension or no tension in the cable. Preferably, the tension sensor is a strain gauge. The system can be attached to any mobile vehicle, e.g. a robot, requiring a cable for control, power and/or communication. It can allow two way transmission of voice, data, video, power and commands through all speeds, directions, motions and turns, including pivot turns, of the vehicle. The system can be used for deploying and retracting fiber optic, metallic or combination cables.

84 Claims, 13 Drawing Sheets

FIG. 5
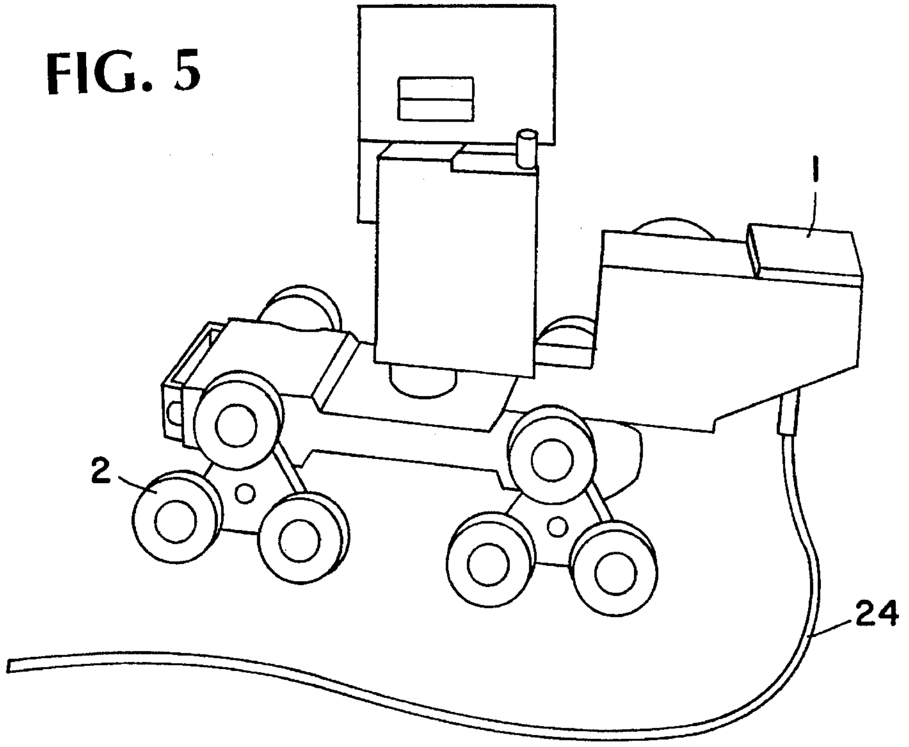
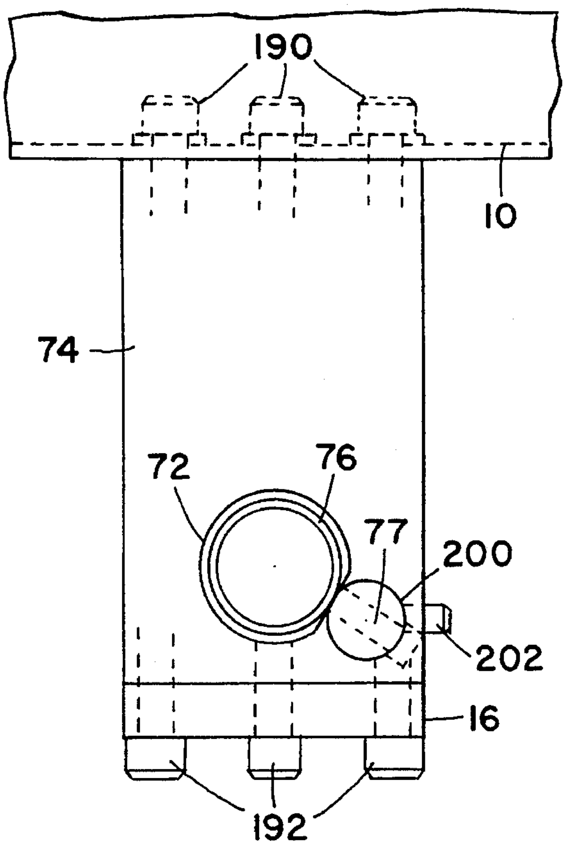
FIG. 11

FIG. 6
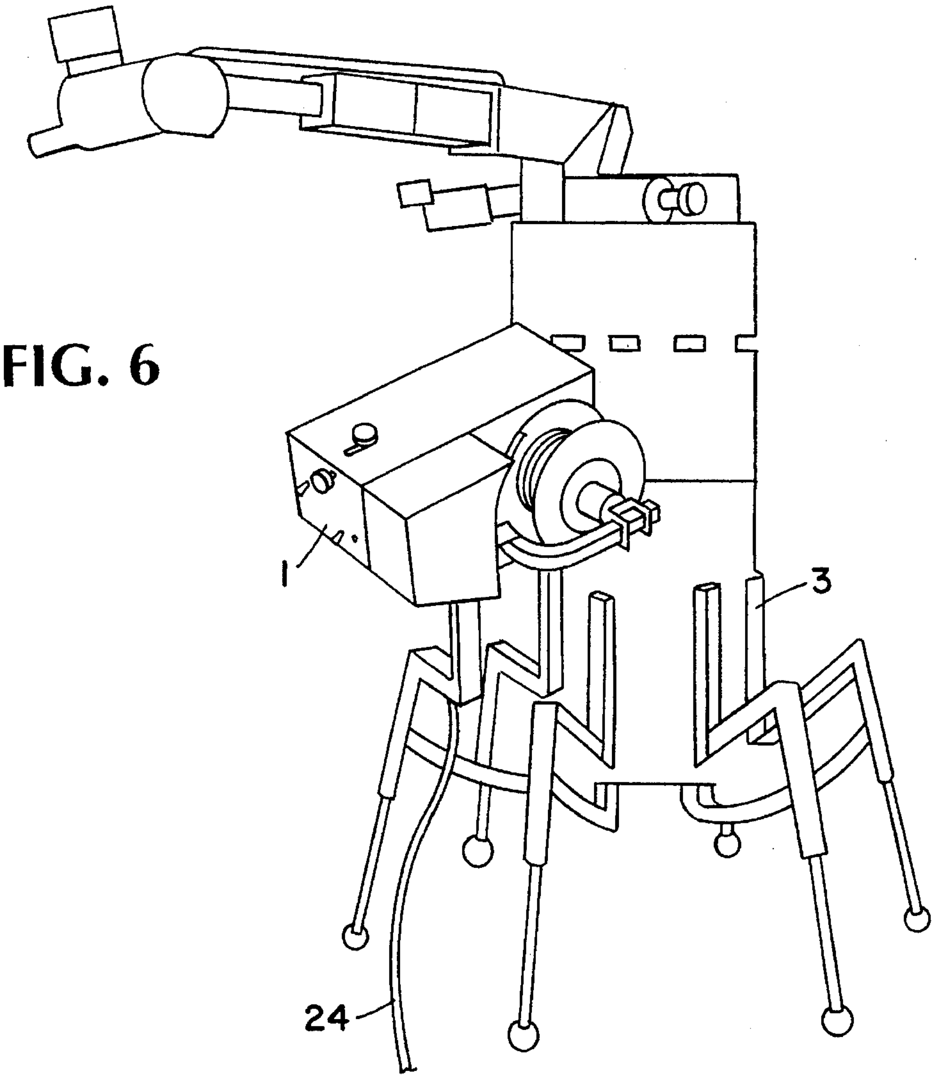
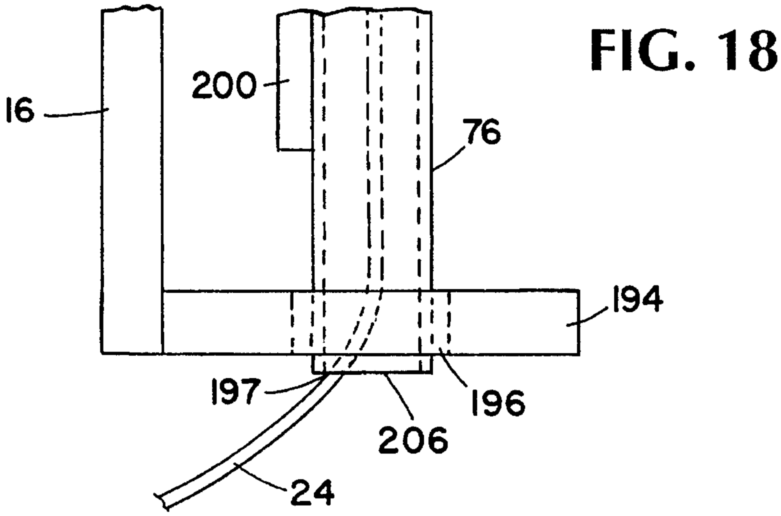
FIG. 18

FIG. 19
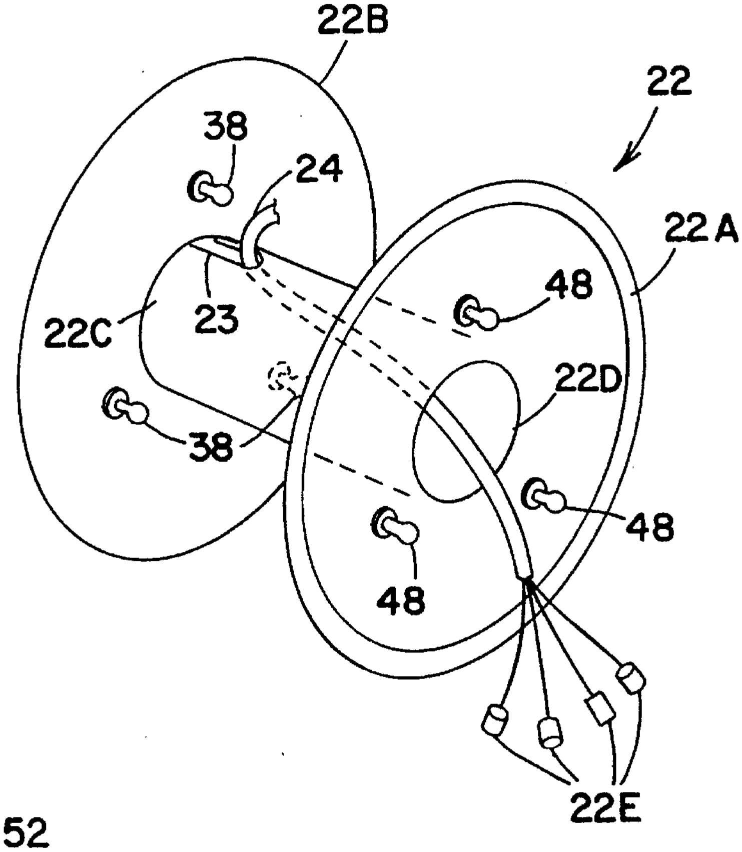
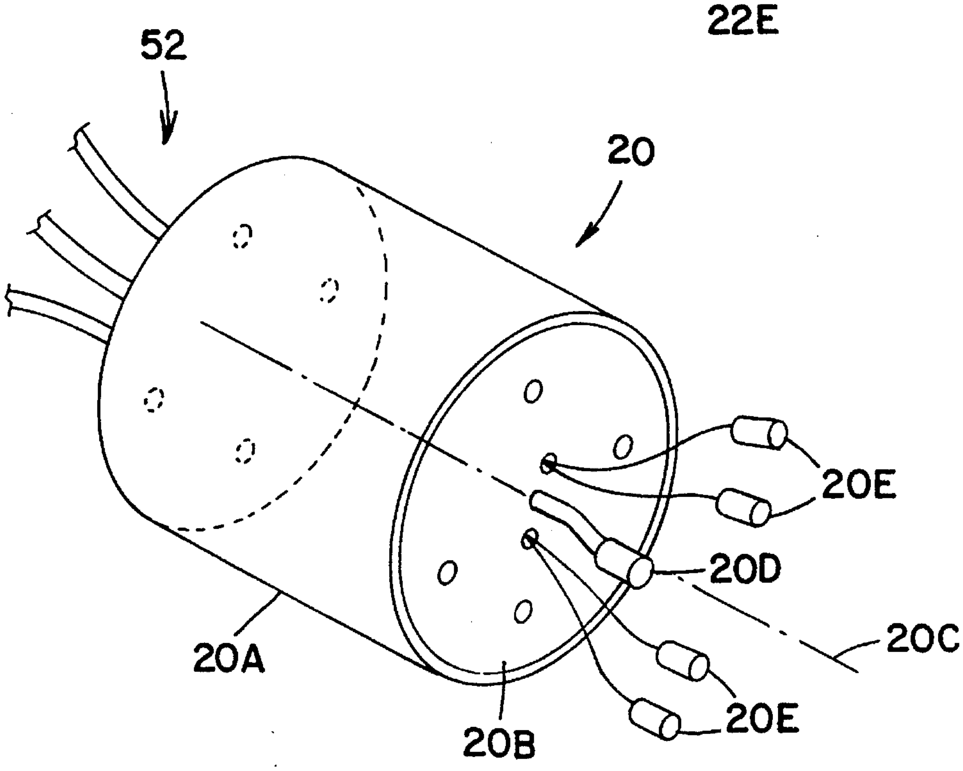
FIG. 20

AUTOMATIC DEPLOYMENT AND RETRIEVAL TETHERING SYSTEM

BACKGROUND OF THE INVENTION

The present invention relates to an automatic deployment and retrieval tethering system. In particular, the present invention relates to a system for automatically winding and unwinding cable, for example, fiber optic or electrical cable or a combination of both, from a moving vehicle. The moving vehicle might be, for example, a remotely controlled robot.

The invention relates to a cable deployment and retrieval system for a moving object, for example a robot having a tether or umbilical cord. Some robots do not use radio control, for example, because of interference, and require an umbilical cord to be attached to the robot to transmit or receive information or data, for providing control and possibly power, if the robot does not include its own power source. The problem with such umbilical cords or tethers is deploying the cable so that the cable does not become tangled when the robot moves in different directions. The cable deployment system must be able to deploy the cable as the robot moves forward and retract the cable as it reverses. In addition, the system must be able to allow the robot to go around corners without placing excess tension on the cable and must allow the robot to turn, sometimes in very tight quarters, without snagging the cable. There may be situations where even though the robot is not moving forward or backward, the cable must either be retracted or deployed, depending upon the turn that the robot is making. Additionally, the robot must be able to drive over the cable without snagging the cable and while still allowing cable to be extended or retracted.

There have been various attempts in the prior art to provide cable deployment systems. However, all of the prior art devices, as far as applicant is aware, suffer from various drawbacks.

U.S. Pat. No. 4,736,826 to white et al. is exemplary of efforts made in the prior art. In that patent, the tethering system uses a cable feed drive motor that deploys and retrieves cable. The system is wholly dependent on receiving encoded signals originating from the direction of rotation of the drive wheels of the robot vehicle itself.

Because in the device of the White et al. reference the cable feed drive motor is dependent on wheel rotation, and not on actual vehicle movement, if there is any slippage between the wheels and the ground, so that the wheels spin or in trying to stop, slip, the signal that would be sent through the encoders to the cable reel motor would reflect the rotation or non-rotation of the wheels, but not the actual movement of the vehicle. This would cause an incorrect amount of cable to be deployed or retracted by the cable reel motor relative to the actual vehicle movement, resulting in damage to the cable or the robot.

Another disadvantage of the device of the White et al. reference relates to when a robot is pivoted around its own center point. For example, if the drive wheels in the White et al. device would rotate in opposite directions with the same rotational speed, the robot would basically pivot around its own center point, and the encoder signals coming from the opposite drive wheels would vector each other out, and no cable would exit from the vehicle. However, as the exit point of the cable is above the pivot wheel, which is at some radial distance away from the exampled pivot turning center of the robot, the cable would have to be deployed at the same circumferential speed as the pivoting robot's cable exit point. However, vectorially the drive wheel encoders would cancel each other out, the cable would not deploy and the cable already deployed would go into extreme tension and break, or stop the robot from pivoting.

Other systems are also known in the prior art for deploying cable from a moving vehicle. In some, tension is sensed in the deployed cable. However, these systems typically employ a dancer arm, tension control arm or tension rollers to sense the tension in the deployed cable. The problem with these systems is that they typically operate in only one direction. For example, U.S. Pat. No. 4,666,102 to Colbaugh et al., shows an apparatus for automatically dispensing and taking up a flexible communications cable such as an optical fiber which includes a motor driven reel which is mounted on a vehicle. The fiber passes through a pivotably mounted tension control arm whose angular position is detected to control the motor. Depending on the position of the tension control arm, the reel may be rotated in one direction to relieve fiber tension or it may be rotated in the opposite direction to take-up slack, or it may remain quiescent.

The problem with the device of the Colbaugh et al. reference is that if the mobile vehicle makes a pivot turn, for example, such that the instantaneous direction of cable exit is at an angle with respect to the tension control arm, the tension control arm cannot respond properly since it can only pivot along one axis. Such a system will result in increased tension in the cable which cannot, be detected properly by the tension control arm, with subsequent damage to the cable and/or vehicle.

In U.S. Pat. No. 4,583,700 to Tschurbanoff, a cable winding system for electrically powered mine vehicles is disclosed. This system utilizes a pivotable extension arm having guide rollers thereon. Again, as in the device of Colbaugh et al., this system is incapable of sensing tension in all directions and is only capable of substantially sensing the tension in a direction collinear with the extension arm.

U.S. Pat. No. 4,692,063 to Conti describes a system for measuring the tension in a cable during underground placement in for example, a furrow formed by a tractor deploying the cable. The system measures the pressure of a hydraulic fluid supplied to a capstan motor to determine the tension in the cable which can be monitored so that if the tension increases the tractor can be stopped. If the tension increases without exceeding a trip point, the tractor can be slowed down to reduce the tension in the cable. The system of the Conti reference is for use in a forward direction only (i.e. unwinding) and further, is incapable of sensing tension in a 360° arc around a cable exit point. Furthermore, the system of that reference is designed for large tractor size cable laying devices and not for mobile vehicles such as robots which perform very complex tasks including pivoting about an axis, rapid changes of direction and forward and reverse motions.

Another example of a unidirectional cable unwinding system is shown in U.S. Pat. No. 4,744,696 to Vidler. This device utilizes a slack loop formed in the cable during paying out and the amount of the cable in the slack loop is monitored to determine the tension in the cable.

SUMMARY OF THE INVENTION

It is accordingly an object of the present invention to provide an automatic deployment and retrieval tethering system, i.e. an automatic cable deployment and retrieval system.

It is still a further object to provide an automatic cable deployment and retrieval system which can be used with mobile vehicles.

It is yet still a further object of the invention to provide such an automatic cable deployment and retrieval system which can be used for mobile vehicles such as remotely controlled robots which employ a tether system for providing power, control and/or communications.

It is yet still a further object of the invention to provide such an automatic cable deployment and retrieval system which can be used with varying types of cable, for example, electrical cable, power cable, control cable, communication cable, fiber optic cable etc. The cable may carry electrical signals or power through metallic conductors or may comprise a fiber optic cable or a combination of both.

It is yet still another object of the invention to provide an autonomous automatic cable deployment and retrieval system which can be used interchangeably with different mobile vehicles or robots, i.e., a device which can be substantially "bolted on" to a variety of mobile vehicles.

It is yet still a further object of the invention to provide such an automatic cable deployment and retrieval system which is unitized, self-contained, self-regulating, self-programming and automatic.

It is yet still another object of the invention to provide such an automatic cable deployment and retrieval system which can be attached to any robotic vehicle, permitting continuous two way transmission of voice, video, data, power and command through all speeds, directions, motions, turns, including pivot turns, of the vehicle to which it is attached.

It is yet still a further object of the invention to provide such an automatic cable deployment and retrieval system which uses a novel system for measuring the strain in the deployed cable to control cable deployment or retrieval. In particular, it is an object of the invention to provide a strain gauge for sensing cable tension for controlling the deployment or retrieval of the cable.

It is yet still a further object of the invention to provide such an automatic cable deployment and retrieval system which allows deployment and retrieval of fiber optic, metallic, or a combination cable, through all motion modes, with zero or pre-defined lay-down tension and smooth level wind storage onto or off of a self-contained cable reel which is attachable to the device.

It is yet still a further object of the invention to provide such an automatic cable deployment and retrieval system whose control is independent of the rotation of or direction of rotation of the drive wheels or other movement causing member of the vehicle itself.

It iS yet still a further object of the invention to provide such an automatic cable deployment and retrieval system which is completely autonomous and independent of any signals from the drive mechanism of the vehicle, or the vehicle itself, as it senses a need to deploy or retrieve cable or remain dormant, based on a self-contained cable strain sensor which itself accounts for the actual relative direction, motion and speed between the vehicle to which the cable deployment and retrieval system is attached and the deployed cable itself.

It is yet still a further object of the invention to provide a much simpler cable deployment and retrieval system than provided in the prior art. Using strain gauge sensors, it is possible to obtain such a device.

It is yet still a further object of the invention to provide such an automatic cable deployment and retrieval system which eliminates the need for all speed and direction circuitry or mechanical linkages between the robot or robot drive motor and the cable deployment and retrieval system.

It is yet still a further object of the invention to eliminate all gearing, chain drives, optical encoders and encoder mounts between the vehicle wheels or drive system and the cable deployment and retrieval system.

It is yet still a further object of the invention to provide an automatic cable deployment and retrieval system which will retract cable when the vehicle reverses itself but, in addition, due to the action of a strain gauge sensor, will also retract the cable when it returns directly, in a forward direction, to its monitoring station.

It is yet still a further object of the invention to provide an automatic cable deployment and retrieval system which allows the vehicle to which it is attached to reverse itself or simply turn around to head back to its monitoring station with proper deployment and retrieval of the cable in such a situation.

It is yet still another object of the invention to provide an automatic cable deployment and retrieval system which includes sensor means for allowing 360° sensitivity to the tension in the cable where it exits the automatic cable deployment and retrieval system.

It is still yet a further object of the invention to provide an automatic cable deployment and retrieval system which uses a sensor which senses the cable strain pressure on its surface in any direction such that the system can deploy or retract cable regardless of whether the vehicle is moving forward, backward, sideways or pivot turning.

It is still yet another object of the invention to provide an automatic cable deployment and retrieval system which is flexible enough to be used with different width cable reels and varying thickness cables.

The above and other objects of the invention are achieved by an apparatus adapted to be mounted on a mobile vehicle for deploying and retrieving cable from the vehicle into the vehicle environment comprising: a frame for mounting to the vehicle; means on the frame adapted to receive a cable storage reel having cable wound thereon for rotatable motion, the cable on the reel having a first end near the center of the reel, a wound portion of cable on the reel and an unwound portion of cable that extends from the reel; means for coupling the first end of the cable to the vehicle; means for feeding the cable comprising the unwound portion on and off the cable storage reel; means including a cable exit area for guiding the unwound portion of cable from the vehicle into the environment in any direction defined by a 360° arc around the cable exit area; means for sensing the tension in the unwound portion of cable in any direction defined by the 360° arc around the cable exit area; and means coupled to the sensing means receiving a signal from the sensing means related to the tension in the unwound cable for controlling said feeding means so as to maintain a preset tension or no tension in the unwound cable. The ability to sense cable tension in an arc of 360° about the cable exit opening allows the device to be used to deploy cable connected to vehicles which have varying speeds, turn in any direction including pivot turns, go around obstacles and corners and reverse direction.

In accordance with the invention, the means for sensing preferably comprises a strain gauge for generating a signal related to the amount of tension in the cable.

Preferably, the means for feeding cable on and off the cable storage reel comprises a drive means comprising a drive motor for driving the cable storage reel in rotation and a pair of drive rollers for receiving the cable from the storage reel between surfaces of the rollers, at least one of the rollers being driven by a drive roller motor.

In accordance with a preferred embodiment, the means for controlling comprises circuit means electrically coupled to the strain gauge for controlling the rotation of the drive means and for controlling the rotation of the drive rollers so as to maintain the preset tension or no tension in the unwound cable.

Further in accordance with a preferred embodiment, the means for sensing further comprises a member having an exit opening for the cable, the opening have a perimeter, the cable being provided through the opening so that it can come into contact with the perimeter of the opening over 360° of the perimeter of the opening, the cable thereby exerting a force on the perimeter of the opening related to the tension in the cable, the strain gauge being coupled to the member having the exit opening and providing a signal related to the force applied and thereby to the tension in the cable.

In the preferred embodiment, the member having the exit opening comprises a tubular conduit, the tubular conduit being coupled to the strain gauge. The tubular conduit moves when the cable applies a force thereto, thereby flexing the strain gauge and generating a signal related to the tension in the cable. Minute forces in the cable can be detected and amplified with suitable electronic amplification circuitry to control cable deployment.

Preferably, a means for limiting movement of the tubular conduit is provided. The means for limiting movement in the preferred embodiment comprises a plate having an opening larger than an outside diameter of the tubular conduit with the tubular conduit extending through the plate opening, and thereby defining a clearance between an inner surface of the plate opening and the tubular conduit.

In accordance with the preferred embodiment, a fixed mounting support is mounted to the frame, the strain gauge being coupled between the mounting support and the tubular conduit. A rigid bracket is fastened to the mounting support and extends downwardly adjacent the strain gauge and tubular conduit and is fastened to the plate having the opening larger than the outside diameter of the tubular conduit, thereby securing the plate in position around the tubular conduit.

Further in accordance with the invention, a means for coupling the first end of the cable which is at the center of the cable reel to the vehicle comprises a rotating joint for providing communication between the cable wound on the reel and the vehicle. Preferably, a hinged conduit supporting the rotating joint and for guiding the cable connected to the rotating joint to the vehicle is provided. The rotating joint may comprise, for example, a means for providing electrical and/or fiber optic communication with the cable on the cable reel, e.g., an electrical/fiber optic rotating joint.

In accordance with the preferred embodiment of the invention, means for guiding the cable onto the cable reel so as to achieve a level wind of the cable on the cable reel is provided. The means may comprise a flaking loop which reciprocally moves across the width of the cable reel.

Preferably, the traverse and starting point of the flaking loop which is reciprocally movable across the width of the cable reel is adjustable to accommodate different width cable reels. Provision is made for maintaining the starting point of the flaking loop traverse at a fixed point.

In accordance with a preferred embodiment of the invention, the cable reel drive means is turned on only to retrieve cable and is not turned on when cable is deployed. When cable is deployed, the cable reel turns freely only against the braking action provided by the reducing gear transmissions forming a part of the apparatus.

Further in accordance with the preferred embodiment, the roller drive motor is bi-directional so as to turn in a first direction to deploy cable and to turn in a second opposite direction to retrieve cable, with the cable reel drive means being controlled so as to maintain a prescribed tension in the cable between the cable reel and the drive rollers during cable retrieval.

In accordance with a further aspect of the invention, a method is provided for deploying and retrieving cable from a mobile vehicle into the vehicle environment comprising mounting a cable storage reel for rotatable motion on a frame coupled to the vehicle, the cable having a first end near the center of the reel, a wound portion of cable on the reel and an unwound portion of cable that extends from the reel, coupling the first end of the cable to the vehicle, feeding cable comprising the unwound portion on and off the cable storage reel, guiding the unwound cable from the vehicle from a cable exit area into the vehicle environment in any direction defined by a 360° arc around the cable exit area, sensing the tension in the unwound cable in any direction defined by the 360° arc around the cable exit area, and receiving a signal related to the tension in the unwound cable and bi-directionally controlling the feeding of cable so as to maintain a preset tension or no tension in the unwound cable.

In addition to robots as commonly envisioned, the invention may be applied to any type of unmanned autonomous vehicle, such as Bobcats, backhoes, diggers, ground moving equipment, etc., which may be used in any hazardous environment such as waste dumps sites, radiation or chemically polluted sites, explosive removal and for use also with manned vehicles for automatically deploying cable along roads, fields, beaches, etc.

Other objects, features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which:

FIG. 5 shows the automatic cable deployment and retrieval system according to the present invention mounted to a wheeled robot, showing an exemplary use of the invention;

FIG. 6 shows the automatic cable deployment and retrieval system according to the present invention utilized on a "walking" type of robot;

FIG. 11 is a top view of the support for the cable strain sensing assembly used in the automatic cable deployment and retrieval system of the present invention;

FIG. 18 illustrates a detail of the cable strain sensing apparatus;

FIG. 19 shows a cable reel illustratively used with the invention; and

FIG. 20 shows a fiber optic/electrical rotating joint useful in the invention.

DETAILED DESCRIPTION OF THE INVENTION

Figure 1:
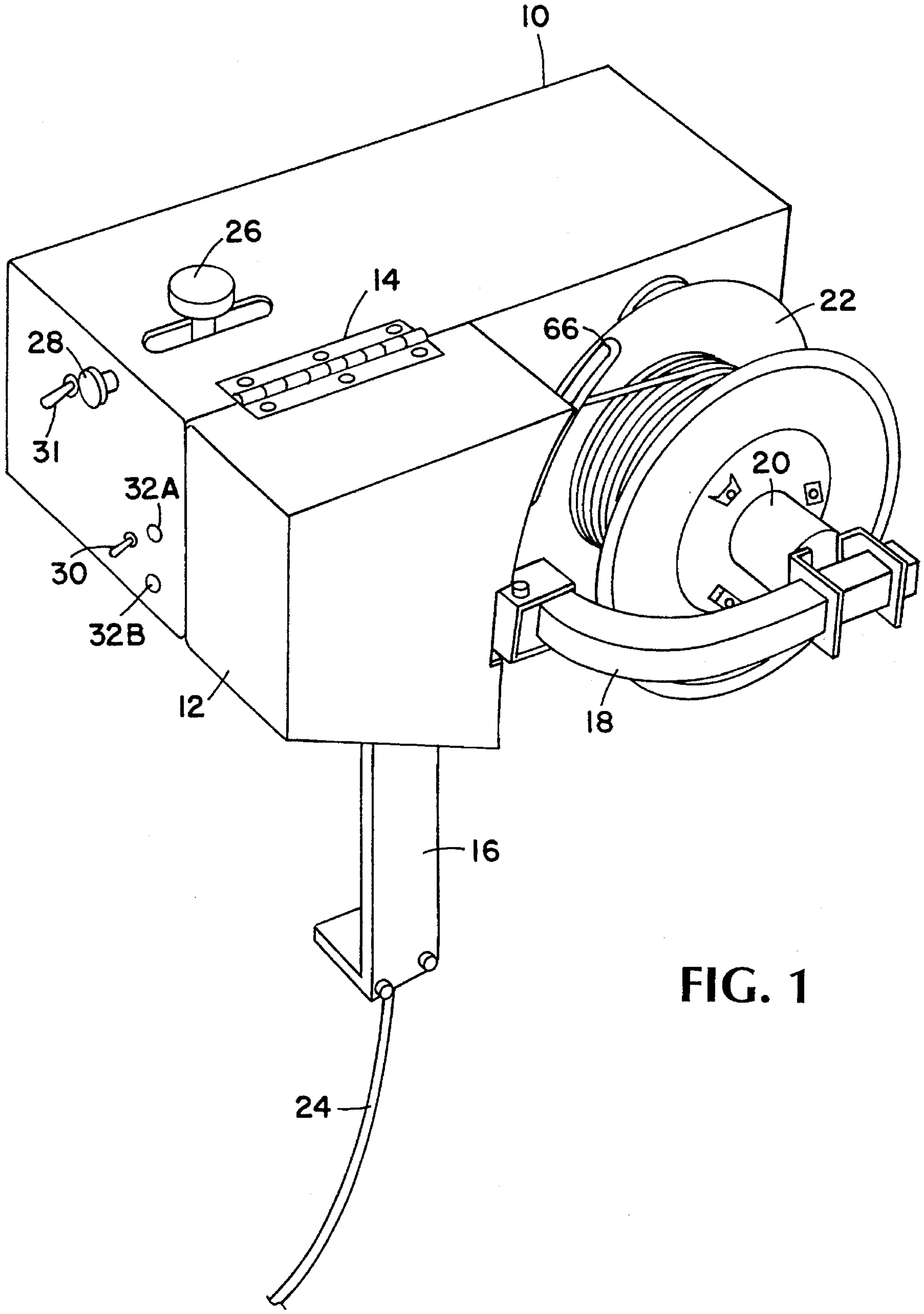
FIG. 1 is a perspective ¾ view of the front of the automatic cable deployment and retrieval system.
Figure 2:
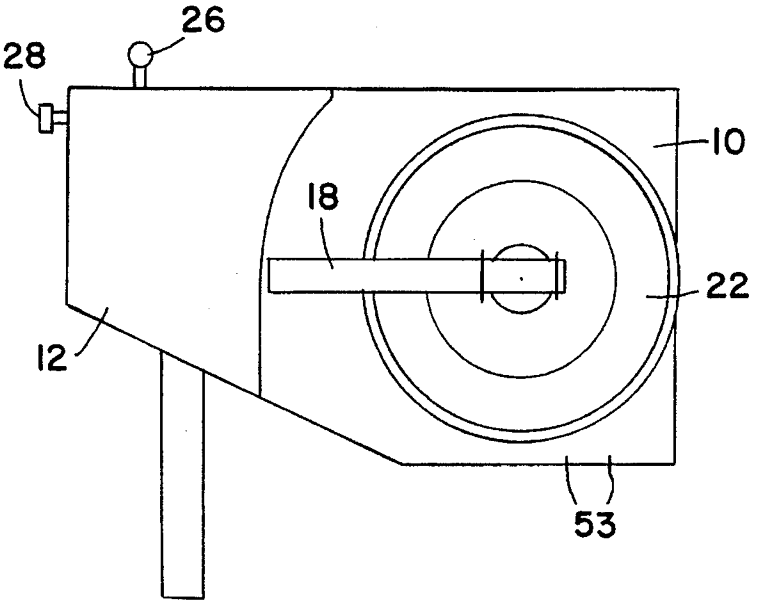
FIG. 2 is a plan view of the front of the automatic cable deployment and retrieval system.
Figure 3:
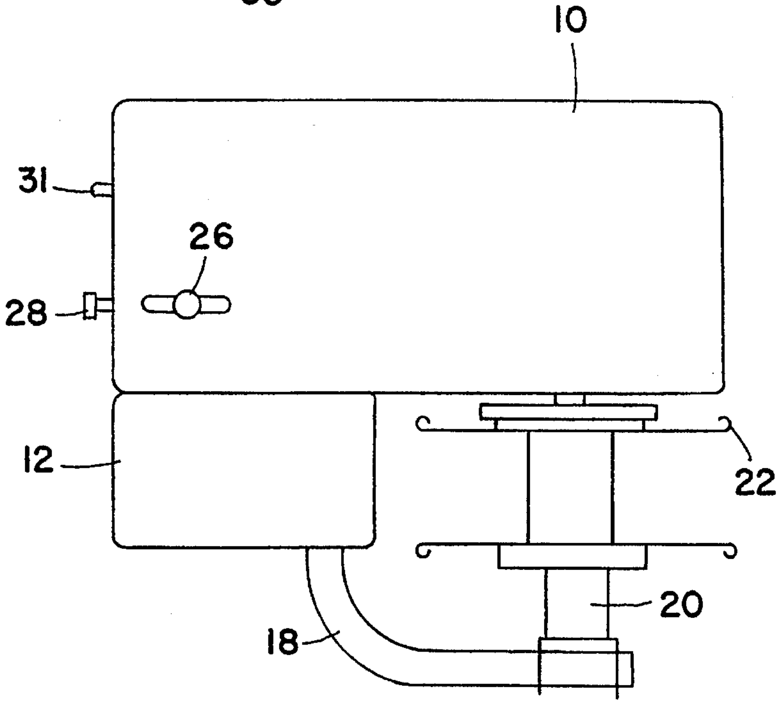
FIG. 3 is a top plan view of the automatic cable deployment and retrieval system.
Figure 4:
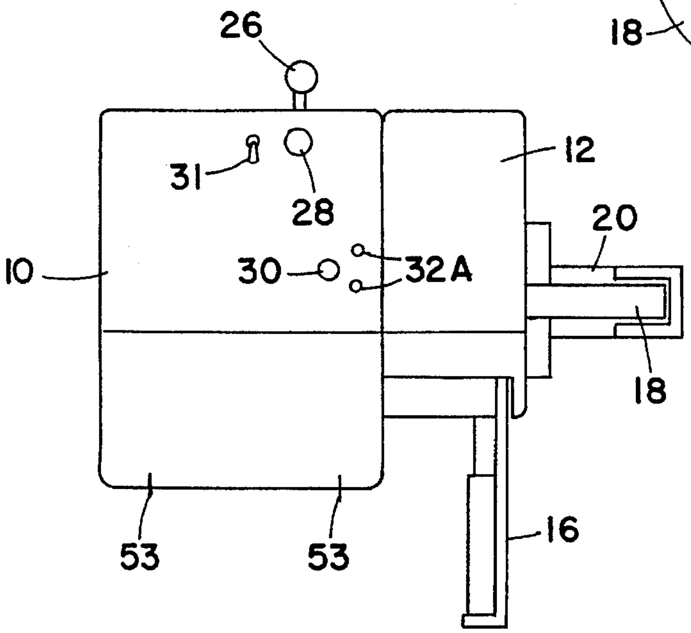
FIG. 4 is a side view of the automatic cable deployment and retrieval system according to the present invention corresponding to a view looking from the left in FIG. 1 or FIG. 2.

With reference now to the drawings, FIG. 1 shows a perspective view of the automatic cable deployment and retrieval system according to the present invention, generally designated 1. The device 1 includes a main housing 10, a subsidiary hinged housing 12 hinged at the hinge 14, a cable deployment retrieval exit bracket 16 which also serves as a strain sensor motion limiting device (to be described below), a hinged conduit 18 for supporting a fiber optic/electrical rotating joint 20 and for leading wires from the rotating joint 20 into the housing 10 for providing control, communications and/or power to the vehicle upon which the system is disposed, and a removable cable reel 22 upon which the deployed cable 24 is wound. The free deployed end of the cable 24 is coupled to a monitoring control and/or power station for the mobile vehicle to which the system 1 is fastened.

In addition, projecting from the housing 10 is a loading knob 26 for relatively moving pinch rollers, to be described later, so that the cable can be loaded into the device for deployment. Also provided is a tension adjusting knob 28 which will be described hereinafter, as well as a switch 30 having two positions, "null" and "run", and two potentiometers 32A and 32B for adjustment of the null point, and whose function will be described in greater detail below. Also provided is a main power circuit breaker 31.

FIG. 5 shows the automatic cable deployment and retrieval system according to the present invention mounted to a wheeled robot 2, and FIG. 6 shows the device according to the present invention attached to a "walking" type of robot 3 equipped with a robot arm holding a television camera. The present invention is not limited to use with remotely controlled robots. It may be used with any vehicle requiring a tether for control, communications and/or power or for any other purpose. For example, it is equally applicable to a manned vehicle which is provided with electrical power from a remote source or is provided with communication cables or for deploying cable.

Figure 7:
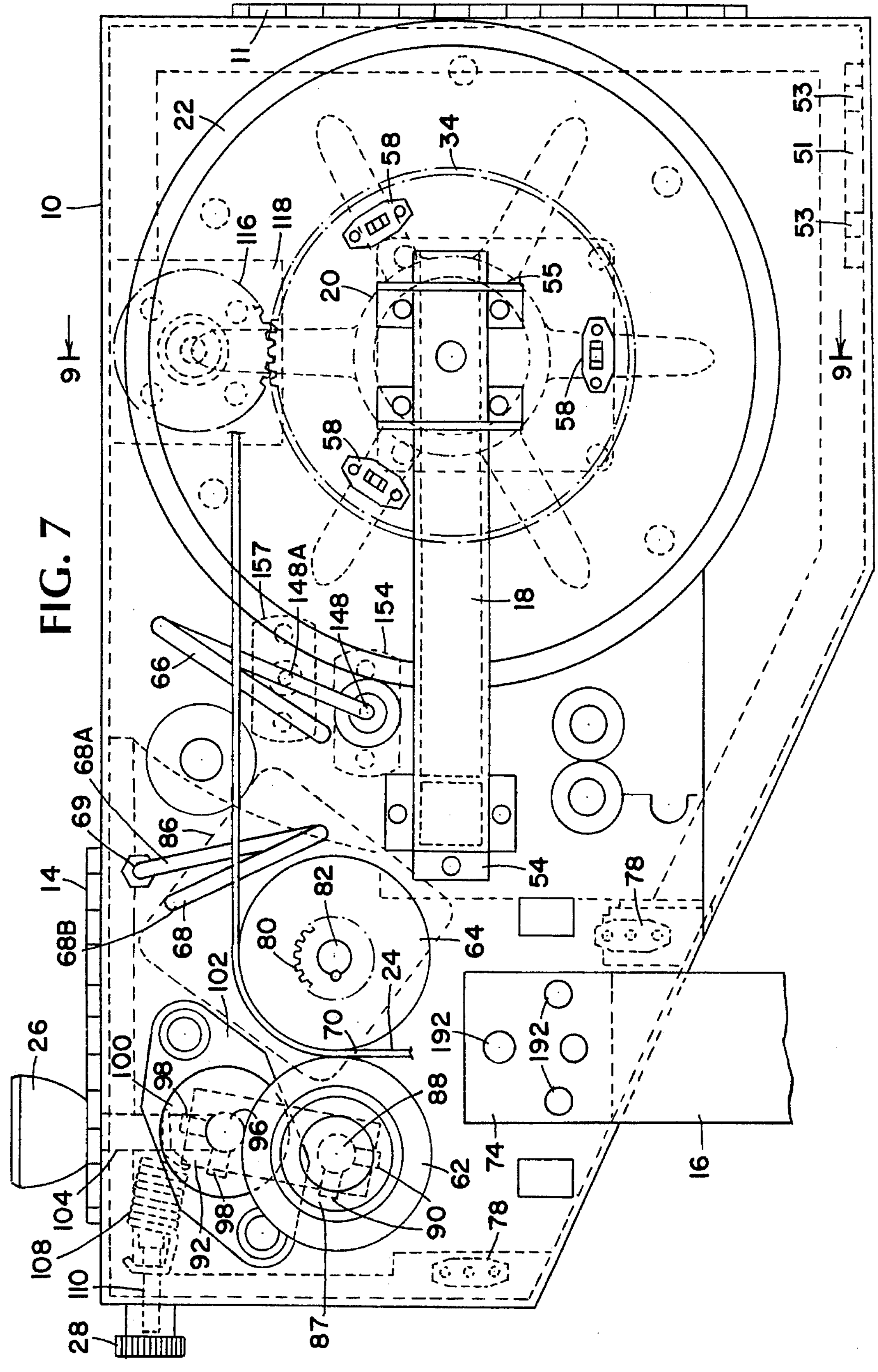
FIG. 7 is a detailed front view of the automatic cable deployment and retrieval system according to the present invention, showing details of the internal mechanism in phantom and corresponding to FIG. 2.
Figure 8:
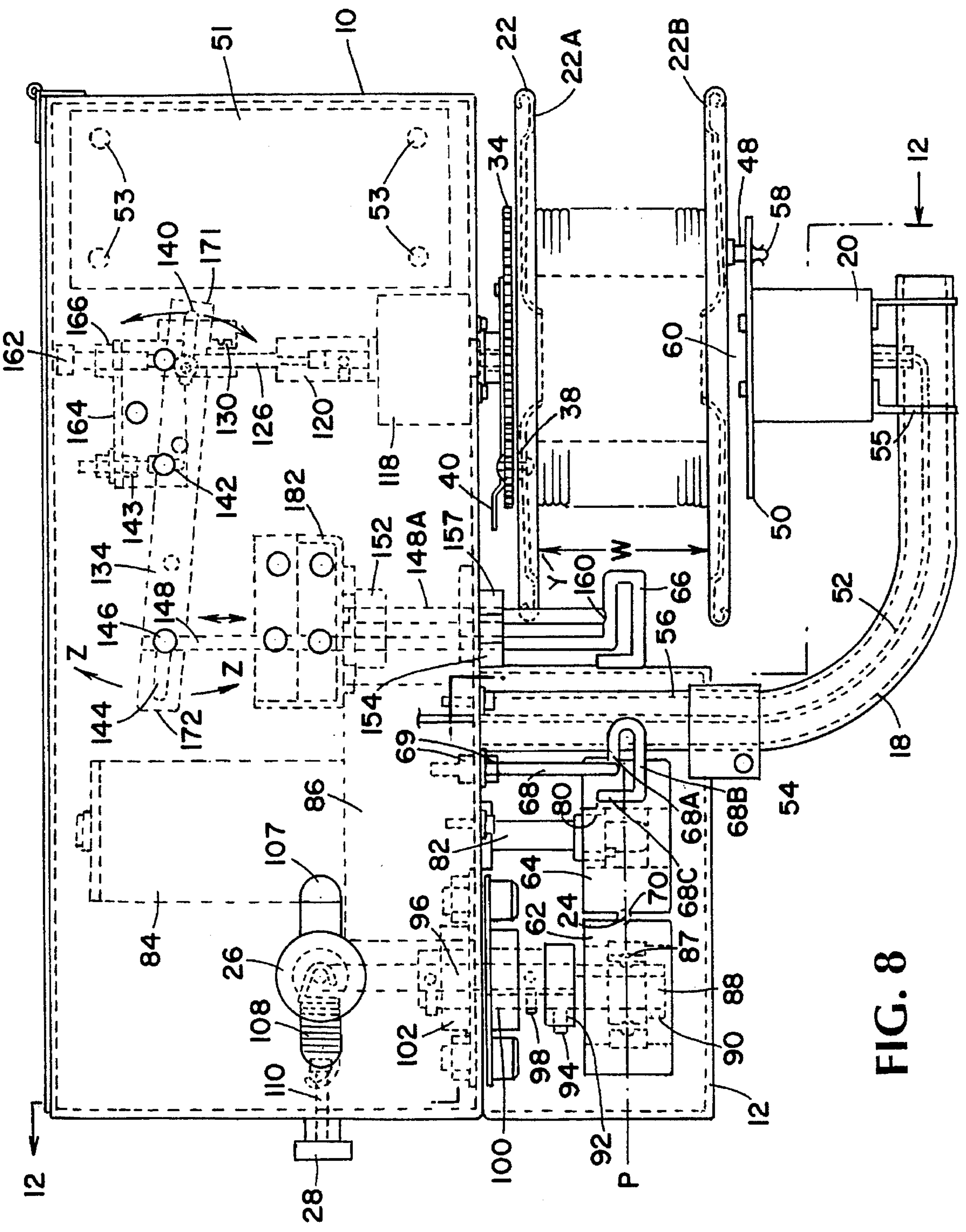
FIG. 8 is a top view of the automatic cable deployment and retrieval system according to the present invention, showing the details of the mechanism in a phantom view corresponding to FIG. 3.
Figure 9:
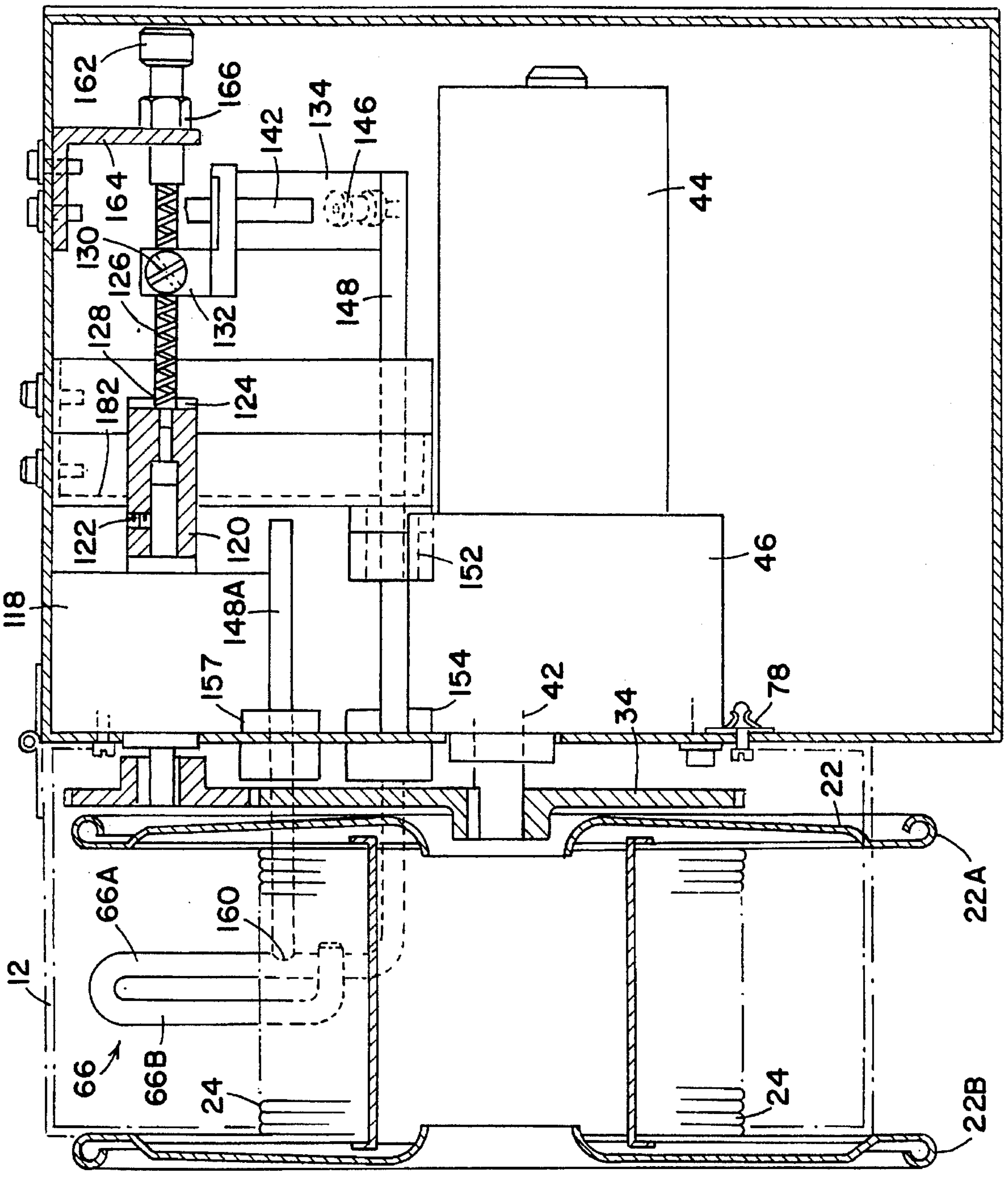
FIG. 9 is a right side phantom view of the automatic cable deployment and retrieval system according to the present invention taken along line 9—9 of FIG. 7, corresponding to the side opposite the side shown in FIG. 4, i.e. corresponding to a view looking from the right in FIG. 2.

With reference now to the detailed drawing FIGS. 7–18, which show details of the automatic cable deployment and retrieval system according to the present invention, cable reel 22 is removably supported on a gear plate 34. Gear plate 34 includes three equally spaced keyhole slots 36 (FIG. 14) which receive grooved studs 38 (FIG. 8) which are mounted to the back of cable reel 22 flange 22A. To mount the cable reel 22 on the plate 34, the grooved studs 38 on the cable reel flange 22A are inserted first through the respective large diameter portions 36B of the keyhole openings 36 and rotated slightly in a counterclockwise direction to allow the grooved studs to slide into the respective small width portions 36A of the keyholes. A manually releasable spring clip 40 is attached to the back side of the gear plate 34, to lock the cable reel in position once the studs 38 are located within the smaller sections 36A of the keyholes 36. Gear plate 34, as shown in more detail in FIG. 9, is coupled to a shaft 42 which is driven by a main drive motor 44 through a reducing gear transmission 46. Transmission 46 is provided to achieve the required speed range for the cable reel 22.

On the front flange 22B, three equally spaced ball studs 48 (FIG. 8) are provided, which releasably engage with a rotating joint fastening plate 50. The rotating joint fastening plate is secured to the rotating part of a rotating joint 20, which may be a fiber optic/electrical rotating joint.

FIG. 20 shows a perspective view of a typical rotating joint 20, showing the rear of the joint which is attachable to rotating fastening plate 50 which releasably engages the cable reel. The joint 20 includes a stationary outer main housing 20A which is coupled to the brackets 55. See FIG. 8. Stationary fiber optic/electrical cables 52 exits from the stationary housing and is fed into conduit 18. The center 20B of the rotatable joint is rotatable about an axis 20C. This portion includes a central fiber optic cable with connector 20D and various electrical conductors with connectors 20E. These are coupled to the fiber optic and/or electrical cable 24 on the cable reel 22, as will be explained below.

The purpose of the rotating joint is to allow communication of electrical signals on the electric conductors and light signals on the fiber optic conductors in the cable 24 wound on the reel 22, which is rotating, with the stationary conductors and fiber optic conductors 52 threaded through the conduit 18. The electrical/fiber optic conductors 52 are guided through the conduit 18 into the housing 10 of the deployment system and then connected to the vehicle itself. The cables 52 may be used for a number of purposes, including power for the vehicle upon which the invention is disposed, for control signals for the vehicle or communications, for example, for television, radio or camera signals. In addition, the cable deployment and retrieval device of the present invention may be powered from the cables 52 or it may receive power from the robotic vehicle itself on which it is mounted or from its own power source such as batteries, e.g., rechargeable batteries.

FIG. 19 shows an illustrative cable reel which can be used with the invention. The cable 24 is wound on the cable reel 22. Only a small portion of the cable 24 near the end which is first wound on the cable reel is shown in FIG. 19, for clarity. The cable 24, when wound on the reel 22, is first inserted through a hole 23 located on the inner drum part 22C of the cable reel. The cable is threaded through the hollow center portion 22D of the drum and extends out. Pigtail and fiber optic connectors, as necessary, are provided for connection to the rotating part of rotating joint 20, which is coupled to the studs 48 via snap sockets 58 on plate 50.

The automatic cable deployment and retrieval system according to the invention is illustratively mounted to the vehicle by bolts placed through holes 53 in a relatively thick plate 51 located at the bottom of housing 10.

The rotating joint 20 is commercially available from companies such as ElectroTech Corp. of Blackburn Va. and others, and generally includes a number of pigtail leads and a fiber optic connector on both the rotating and stationary sides which are coupled to the respective portion of the rotating cable 24 at the center of the reel and stationary cable 52.

Conduit 18 is fastened at the reel end to a fastening bracket 55 which in turn is fastened to the stationary housing of the rotating joint 20. The other end of conduit 18 is mounted to a hinge 54 which is attached in turn to a further straight portion of conduit 56 which is secured to the device frame 10.

Rotating joint 20 rotatable fastening plate 50 at the reel includes three ball stud sockets 58 which releasably engage with the ball studs 48 mounted on the flange 22B. Thus, after the reel 22 containing wound cable 24 is installed on the gear 34, conduit 18, which has been moved on its hinge 54 away from the reel area, is moved toward the reel 22. The reel 22 is rotated slightly to line up the ball studs 48 with the ball stud sockets 58, thereby securing the rotating joint to the reel 22 and providing bearing support for the outer flange of the reel 22B. Prior to snapping the sockets 5 onto the studs 48, the necessary electrical and fiber optic connections between the rotating joint 20 and the wound end of cable 24 extending from the center of the reel 22 is made in the area 60. Thus, electrical and light connections are made between the cable 24 on the reel 22 and the cable or cables 52 which are attached to the mobile vehicle.

Turning now particularly to FIGS. 7 and 8, hinged housing 12 covers two drive rollers 62 and 64. The unwound portion of cable 24 for deployment is fed from the reel 22 through a reciprocating flaker assembly 66, then through a cable centralizer 68 and then through the pinch space 70 between the two rollers 62 and 64. Cable 24 is then fed downwardly through a hole 72 in a sensor mounting block 74 and then through a cylindrical conduit 76 to the ground (FIGS. 11, 12, 15 and 18) for deployment. The deployed end is typically coupled to the mobile vehicle's monitoring, control and/or power station.

As shown in FIG. 7, housing 12 is hinged at 14 for internal access and is releasably fastened to the main mounting frame 10 of the device by ball stud snap fasteners received in sockets 78.

Turning again to the drive rollers 62 and 64, drive roller 64 is secured via splines 80 on a rotating shaft 82 which is driven by a roller drive motor 84 through a gear reducing transmission 86.

Idler drive roller 62 is supported for pivoting movement to allow the cable 24 to be initially loaded between the roller 62 and 64. Roller 62 is rotatably supported via a bearing 87 on a shaft 88 and secured to the shaft 88 via set screws 90. Shaft 88 is fixedly attached to a pivoting lever arm 92 via set screws 94. Pivoting lever arm 92 pivots about a pivot point provided by a shaft 96. Lever arm 92 is securely attached to the pivot shaft 96 via set screws 98. Shaft 96 is a part of a load lever arm 104 having a 90° bend and is supported in a bearing 100 provided in a bearing support 102 mounted to the device frame 10. Arm 104 is bent at a right angle from shaft 96 to project upwardly through elongated slot 107 in housing 10. A knob 26 is attached to the projecting end of the arm 104. One end of a tension spring 108 is secured to the load lever arm 104 and the other end of the spring is secured to a screw 110 received through a hole in housing 10 by a tension adjusting knob 28.

When it is desired to deploy cable, the cable is first manually threaded through the loop of reciprocating cable guide (or flaker arm) assembly 66, through the cable centralizer 68, and then down between the rollers 62 and 64. To do this, the knob 26 is moved to the right in slot 107, thereby pivoting roller 62 about the pivot shaft 96 against the tension of the spring 108. This creates a gap between two rollers 62 and 64 at pinch point 70 and the cable may be inserted there-between, and then down through the hole 72 in the sensing support block 74. The cable is further threaded through the strain gauge movement limiting tube 76 to the ground. A description of the function of the tube 76 will be provided later.

The function of the cable centralizer 68 is to locate the cable approximately along the center plane P (FIG. 8) of the two rollers 62 and 64. The centralizer 68 has a downwardly projecting first portion 68A and an upwardly projecting portion 68B which is coupled to the first portion 68A to form a loop. At its top, the portion 68B traverses horizontally in a portion 68C toward the portion 68A to form an open loop to enable easy threading of cable 24 therethrough. The portion 68C clears the portion 68A by approximately the diameter of cable 24.

The centralizer is mounted in a stationary adjustable fashion to the device frame 10 via two nuts 69 as shown in FIG. 8. Adjustment of the cable centralizer 68 to the center plane of the two rollers 62 and 64 is provided by adjusting and locking the two nuts 69 which secure the cable centralizer to the support frame. The desired location of the centralizer 68 with respect to the center plane of the rollers 62 and 64 as well as the desired distance away from the rollers can thus be obtained.

In contrast to the cable centralizer 68, the flaker assembly 66 is a moving element which allows the cable 24 to be deployed from or wound on the cable reel 22 in proper alignment, i.e. it "flakes" the cable onto the reel 22 in a "level wind" fashion. In order to accomplish this function, it must move back and forth across the width W of the cable reel 22 (FIG. 8).

To obtain such a reciprocating motion, a gear 116 (see FIG. 7) is provided which is driven by the reel plate gear 34. In the preferred embodiment, the gear ratio between plate gear 34 and gear 116 is approximately 2½ to 1 so that one revolution of the gear 34 turns the gear 116 2½ times. Gear 116 drives a gear reducing transmission 118. The gear ratio of the gear reducing transmission 118 is determined by the size of the cable being wound on the reel 22 to provide the proper rate of flaker assembly 66 traverse across the width W of the reel 22 for a given reel speed. As is known to those of skill in the art, to obtain a level wind on reel 22, given a certain reel speed, the cable must be moved across the reel so that the cable is laid down in a level wind fashion across the width of the reel. Thus, the output speed of the gear reducing transmission 118 can be determined by a knowledge of the diameter of the cable being wound on the reel 22. For example, if the cable 24 has a diameter of ¼ inch, flaker assembly 66 must move ¼ inch for each rotation of cable reel 22. In the embodiment shown, a fixed ratio transmission 118 is provided which transmission can be changed to accommodate different thickness cables. The reducing transmission 118 could be made variable, however, and preferably continuously variable (e.g., a continuously variable belt drive) to allow greater flexibility for different size cables.

Figure 10:
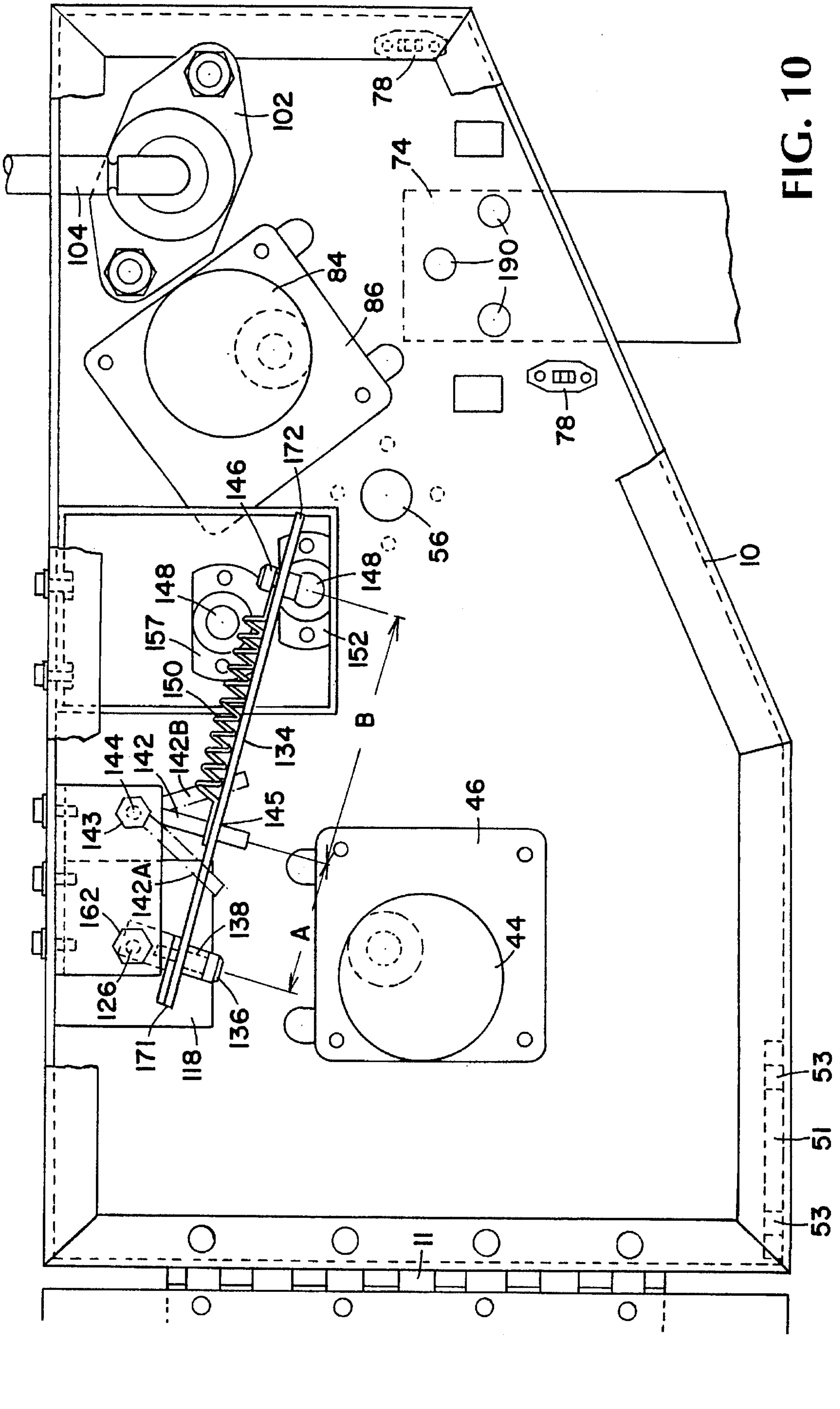
FIG. 10 is a rear plan view of the automatic cable deployment and retrieval system according to the present invention with the hinged back cover opened, corresponding to the back side opposite the side shown in FIG. 2.
Figure 12:
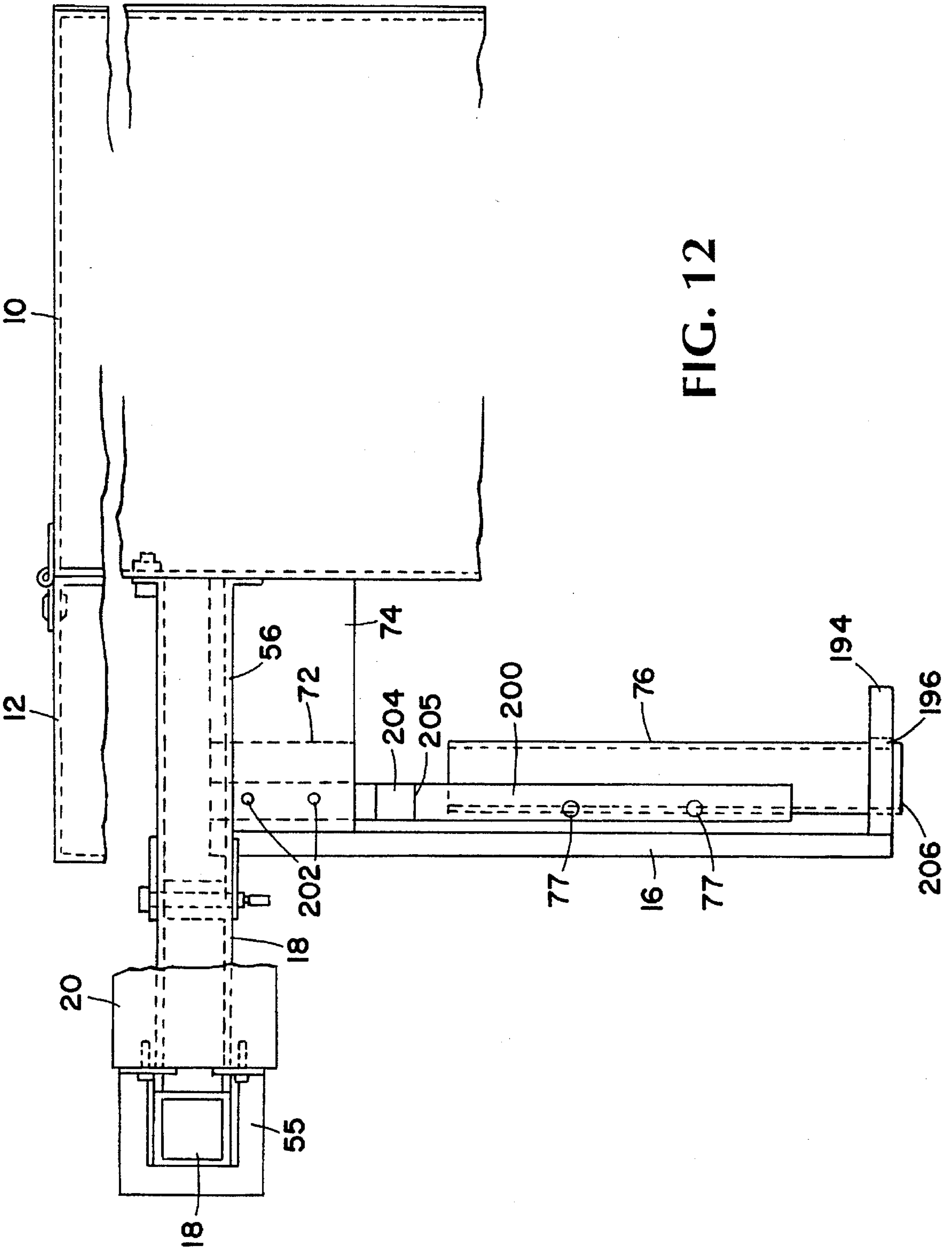
FIG. 12 is a side view of the cable reel hinged conduit assembly and the cable strain sensor assembly used in the present invention and corresponding to a view along line 12—12 of FIG. 8.

The output of the gear reducing transmission 118, as shown more particularly in FIG. 9, is attached to a coupler 120. The coupler 120 is fastened to the output of the gear reducing transmission 118 by a suitable set screw 122. Coupler 120 is provided with a slotted keyed end 124 which receives a level wind screw camshaft 126 provided with a flat end 128. See FIG. 17. The level wind camshaft 126 has a two-direction continuous thread, including a connected continuous right-hand and left-hand thread. Thus, the left and right hand threads are connected to each other at the ends so that a cam follower can continuously reciprocate back and forth as the camshaft turns in one direction. A pivotal cam follower 130 rotatably mounted in a support block 132 rides on the level wind camshaft 126. Cam follower 130 follows the thread in the camshaft 126 across the length of the camshaft. Upon reaching an end, the cam follower 130 is pivoted by the reversing thread thereby to follow the reversed thread back on the return trip along the camshaft 126. The two positions of the cam follower 130 are shown in bold lines and the phantom lines 130A in FIG. 16. Thus, cam follower 130 moves back and forth along camshaft 126 as the camshaft 126 rotates, providing a reciprocating movement to the support 132. The support 132 is L-shaped and is fastened to a descending (see FIG. 10) flaker eccentric lever arm 134 via a shoulder screw 136 and bushing 138. Lever arm 134 is secured slidably to the shoulder bolt 136 in a slot 140. Lever arm 134 pivots about a pivot point provided by an L-shaped pivot pin 142 which is adjustably fixedly attached to the support frame at 144 via suitable nuts 143. The purpose of providing adjustable pivot pin 142 will be described shortly. At the other end of lever arm 134, a further slot 144 is provided into which another shoulder bolt 146 is received. Shoulder bolt 146 is secured to flaker arm assembly rod 148. A spring 150 is provided between pivot arm 142 and lever arm 134 to provide tension to the lever arm 134. FIG. 10 shows the back cover opened on hinge 11 which provides access to the internal mechanism.

Flaker assembly rod 148 is slidably secured in a first bushing 152 secured to bushing bracket 182 and slidably in a second bushing 154 to provide sufficient support. As shown, the flaker arm assembly 66 includes two supporting rods, 148 and 148A. Rod 148A is also supported in a bushing 157. These two supporting guide rods are necessary to prevent rotation of the flaker arm assembly 66. As shown in FIG. 9, the flaker arm assembly 66 is bent upwardly in a first portion 66A along the perimeter of the reel 22, and then downwardly in a second portion 66B and then across the first portion via a horizontal portion 66C to form an open loop through which cable 24 is guided. The portion 66C clears the first portion by the approximate diameter of the cable 24 (similar to centralizer 68). Rod **148*a* is welded or otherwise fixed to the bent portion of the flaker arm assembly at 160**.

Bushing 152 in which the flaker arm rod 148 slides is illustratively supported on a bracket 182 mounted to the device frame.

The flaker arm 66 achieves its reciprocating motion as follows: transmission 118 rotates the coupling 120 as reel 22 turns. Coupling 120 rotates the level wind camshaft 126. Cam follower 130 follows the threads in the camshaft 126 back and forth across the camshaft 126 as it rotates. This causes the lever arm 134 to pivot about the pivot pin 142 defining arcuate motion Z at end 172 (FIG.8).

Figure 17:
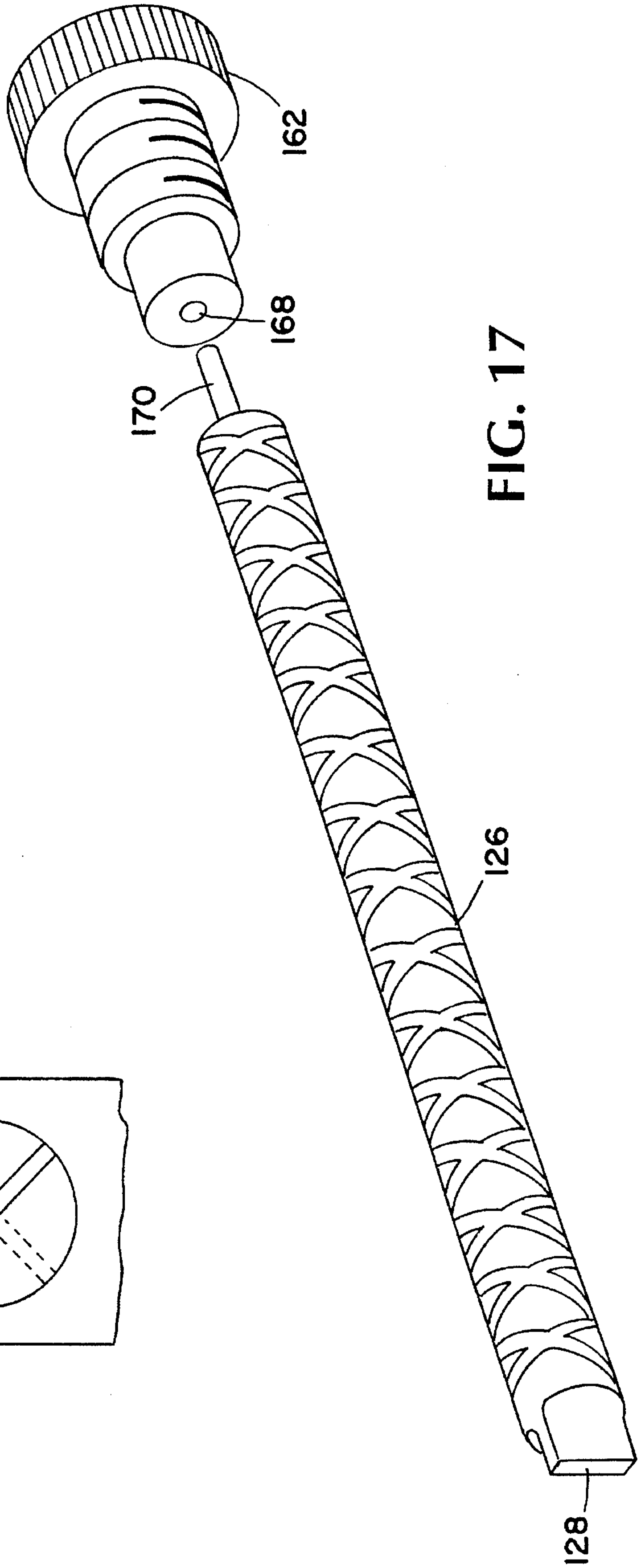
FIG. 17 is a detailed perspective view of a level wind camshaft worm thread used to achieve a reciprocating movement of the cable reel flaker assembly for obtaining level wind of the cable on the cable reel.
Figure 16:
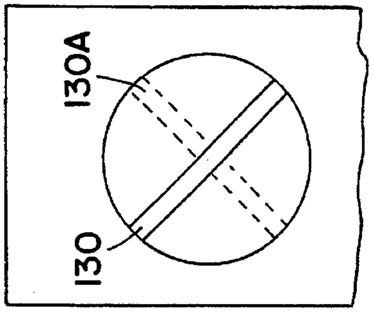
FIG. 16 is a plan view of a cam follower employed in the invention for achieving reciprocating movement of the cable reel flaker assembly which achieves level wind of the cable on the cable reel.

As shown particularly in FIG. 17, level wind camshaft 126 is supported both axially and longitudinally by a thrust adjusting bolt 162 which is threaded into a supporting bracket 164. A suitable thrust load is obtained by adjusting the thumb screw 162 and locking with a nut 166. Thumb screw 162 is provided with a bearing hole 168 which receives a cut down bearing surface 170 of the level wind camshaft 126.

As the cam follower 130 follows the threads back and forth across the camshaft 126, lever arm 134 pivots about the pivot pin 142. The slots 140 and 144 in lever arm 134 are provided because the lever arm 134 describes the arcuate path Z. In addition, the slots 140 and 144 are provided for allowing adjustment for the amount of travel of the flaker assembly 66 across the width W of the reel 22. As the end 172 of the lever arm 134 describes a reciprocating arcuate path Z, flaker assembly arm 66 reciprocates across the width W of the reel 22, guiding the cable 24 uniformly back and forth across the reel 22 to accomplish the level wind.

In order to vary the width W for different width reels, the pivot point 142 can be adjusted by rotating it as shown in phantom in FIG. 10. In FIG. 10, the pivot 142 has been shown in phantom in two additional positions 142A and 142B. In position 142A, the width W across which the flaker assembly 166 traverses has been increased because the length B (between the pivot pin and flaker assembly) has been increased with respect to the length A (between the camshaft 126 and the pivot pin). If a lesser width W is required, the pivot pin 142 would be rotated to the position shown in phantom at 142B, in which case the dimension B has been decreased with respect to the dimension A and therefore the amount of traverse W has been decreased. A suitable clearance hole 145 in the lever arm 134 to receive the pivot pin 142 at an angle as shown at 142A and 142B must be provided. Spring 150 provides suitable tension to the lever arm 134 to maintain a fixed pivot point despite the clearance in the hole 145 provided in the lever arm 134 for the pivot pin 142.

Slots 140 and 144 are necessary not only because the ends 172 and 171 of lever arm 134 describe arcuate paths, but also to allow for the variation in pivot point determined by pivot pin 142. If greater adjustment is necessary than can be obtained by the slots 140 and 144, new holes can be drilled in lever arm 134 for the new pivot point.

Although the width W should be adjustable, the starting point (FIG. 8), i.e, the location of the inner surface of flange 22A of reel 22, must not vary. In order to achieve a variable width W but maintain a fixed starting point Y at the inner surface of the flange 22A, pivot point 142 is also adjustable inwardly and outwardly on bracket 164 via two nuts 143. By loosening the nuts 143 and adjusting the distance of the pivot point from the bracket 164, the location of the starting point Y at which the flaker assembly 66 begins its traverse across the reel 22 may be maintained.

Although a mechanical arrangement for achieving reciprocating movement of the flaker assembly 66 has been described, it will be evident to those of skill in the art that electronic control of the flaker assembly 66 can be provided. For example, an encoder coupled to plate gear 34 can provide pulses to indicate revolutions or portions of revolutions of the reel 22. A motor can be provided driving the flaker assembly 66 incrementally or continuously back and forth across the width W of the reel 22 and which receives control signals from the encoder so that for each reel revolution, the flaker assembly 66 moves the desired amount. The flaker assembly 66 may be driven in discrete increments or continuously using this method, as would be known to those of skill in the art. Such an electronic control may be preferable because it would allow easier programming for different reel widths and cable diameters. A microprocessor could be employed to provide control and simplified programming for different reels widths and cable diameters.

Directly below the pinch point 70 of the rollers 62 and 64, a sensing block mounting support 74 is provided which is secured to the device frame with three bolts 190 (See FIGS. 7 and 11). The sensing block mounting support 74 is a relatively thick piece of metal which is necessary to prevent flexing. Coupled to the support block 74 is downwardly depending protective bracket 16 which is also secured to the block 74 with three bolts 192. The support block 74 includes an aperture therein 72 through which cable 24 traverses. At the bottom of the bracket 16, a horizontally disposed bracket 194 is provided. See FIGS. 12 and 15. Bracket 194 is provided with an aperture 196 which has a diameter somewhat greater than the outer diameter of a tubular conduit 76, also through which cable 24 traverses. See FIGS. 12, 15 and 18. A section of metal 200, made of, for example, aluminum, connects the tubular conduit 76 with the support block 74. The metal rod 200 is suitably fastened to the support block 74 via set screws 202 and to conduit 76 via stud screws 77 welded to conduit 76 and fastened to rod 200 with suitable nuts.

Rod 200 incorporates strain gauge elements 204 at a reduced thickness portion 205 of the rod 200 where flexing is designed to occur. The rod 200 and integral strain gauge elements 204 together comprises a strain gauge and may be a type model number N2A-06-T012R-350 manufactured by Micro Measurements of Raleigh N.C. and available from their catalog TC-116-3. The strain gauge elements 204 may comprise, for example, resistance elements coupled into two balanced bridges, as well known to those of skill in the art. The two balanced bridges provide two resistance signals X and Y, each of which have a defined balance point. The balance point can be set by adjusting a variable resistance in each bridge. The adjusted balance point defines a "null" point, to be described later. When the strain increases on the rod 200 due to tension in cable 24, the resistance of the strain gauge elements in the balanced bridges changes, due to the strain, thereby upsetting the balance. This change in the resistance can be detected and is indicative of the amount of strain present in the rod 200 and the tension in the cable. This resistance signal can be used to control the deployment or retrieval of the cable 24.

The way in which the strain is measured is as follows:

Clearance hole 196 (see FIGS. 12, 15 and 18) is provided somewhat larger than the outside diameter of conduit 76 in order to protect the strain gauge rod 200 from breakage due to overbending or shock. The maximum amount that the strain gauge rod 200 can bend is limited by the clearance between the inner circumference of the hole 196 and the outer surface of the tubular conduit 76.

The invention allows for the deployment and retrieval of cable, no matter what direction the vehicle to which the cable deployment and retrieval system is attached moves, because of its use of strain sensing for measuring the amount of tension in the deployed cable 24. In the present invention, the cable 24, as it is being deployed, will contact an edge of the exit hole 206 of the tubular conduit 76. An example of this contact is illustrated at 197 in FIG. 18. When the cable touches the edge of the exit hole 206, it imparts a strain to the conduit 76 and thus to the rod 200, which strain cause a resistance change in strain gauge elements 204. This change in resistance is measurable by the sensitive circuitry coupled to the strain gauge elements 204. The change in resistance is small, corresponding to only millivolt voltage drops, but is measurable by the strain gauge amplifier circuitry, to be described.

The stress in rod 200 is detected by the strain gauge elements 204 provided at the reduced thickness portion 205 of rod 200. If a strain greater than a reference amount of strain is detected, this means that additional cable must be deployed, i.e., there is greater than desired tension in the cable which must be reduced by playing out more cable. Conversely, if an amount of strain below the reference amount is detected, this means the cable is loose, and therefore the cable must be retrieved to increase the amount of tension in the cable.

The present invention provides significant advantages over the prior art. In the prior art, the cable feed drive motor is dependent on wheel rotation, and not on actual vehicle movement. If there is any slippage between the wheels and ground, and the wheels spin, or in trying to stop slip, the signal that would be sent to the cable reel motor would reflect the rotation or non rotation of the wheels, but not the actual movement of the vehicle. This would cause an incorrect amount of cable to be deployed or retracted by the cable reel motor, relative to the actual vehicle movement, resulting in damage to the cable or the robot.

In the present invention, the cable deployment is autonomous and independent of any signals from the drive mechanism of the vehicle, or the vehicle itself, as it senses the need to deploy, retrieve or remain dormant based upon the amount of strain, as detected by the strain gauge, in the cable. Thus, the present invention deploys and retrieves cable without requiring any direct feedback from any mechanism which governs the direction, motion and speed of the vehicle. The present invention uses only the described strain gauge sensor to determine whether the cable should be deployed or retrieved. The system of the invention always seeks to maintain a defined value of tension (or no tension) in the cable. The system allows cable to be deployed and retrieved by sensing the strain in the cable in any direction (an arc of 360°) about exit hole 206 which results from any change in relative direction, motion and speed between the vehicle to which the device is attached and the deployed cable itself. These latter factors are all accounted for by sensing the cable tension and maintaining the desired cable tension.

The desired tension may be a minute quantity, as the strain gauge system of the invention can be adjusted for and is sensitive to very minute quantities of tension.

The arrangement of the exit hole 206 of tubular conduit 76 at a distance from the strain gauge elements 204 enables very small forces applied by cable 24 to be measured. The leverage provided by the conduit 76 and the strain gauge rod 200 magnifies these minute forces present at exit hole 206, increasing the flexing motion at strain gauge elements 204 and thus enabling high sensitivity to the forces applied by cable 24.

The present invention thus provides a much simplified and much more reliable method of deploying cable from a mobile vehicle.

The present invention, using a strain gauge sensor, is completely autonomous, self contained, self regulating and much simpler than prior art systems. It eliminates the need for all speed and direction circuitry or mechanical linkages between the robot or robot drive motor and the cable deployment and retrieval system. It eliminates all gearing, chain drives, encoders and encoder mounts between the rotating drive system and the cable deployment and retrieval system. It is equally effective in deploying and retrieving metallic, fiber optic or dual component cable.

In the present invention, cable 24 will be retracted when the vehicle reverses itself. In addition, due to the action of the strain gauge, it will also retract the cable when it returns directly, in a forward direction, to the monitoring station for the robot. This is because the null point established in the strain gauge circuitry is adjusted to sense the difference in strain induced voltage when the cable is in deployment mode (null point voltage positive) as opposed to when the cable is in retrieval mode, (null point voltage negative). As a result, whether the robot reverses itself or simply turns around to head back to its monitoring station, the 360° sensitivity of the circular strain gauge cable exit hole 206 senses the lower cable strain pressure on its surface in any direction, and will cause the circuitry to go into retrieval mode to pick up cable. The system is such that it can deploy or retract cable regardless of whether the vehicle is moving forward, backward, sideways or pivot turning. The system is completely adaptable to any change in conditions. For example, if the system is retrieving cable but a snag in the cable occurs, or the robot itself drives over the cable, the cable tension will increase, perhaps momentarily, and the system will shift from retrieving cable to playing out cable, as the conditions demand.

Figure 13:
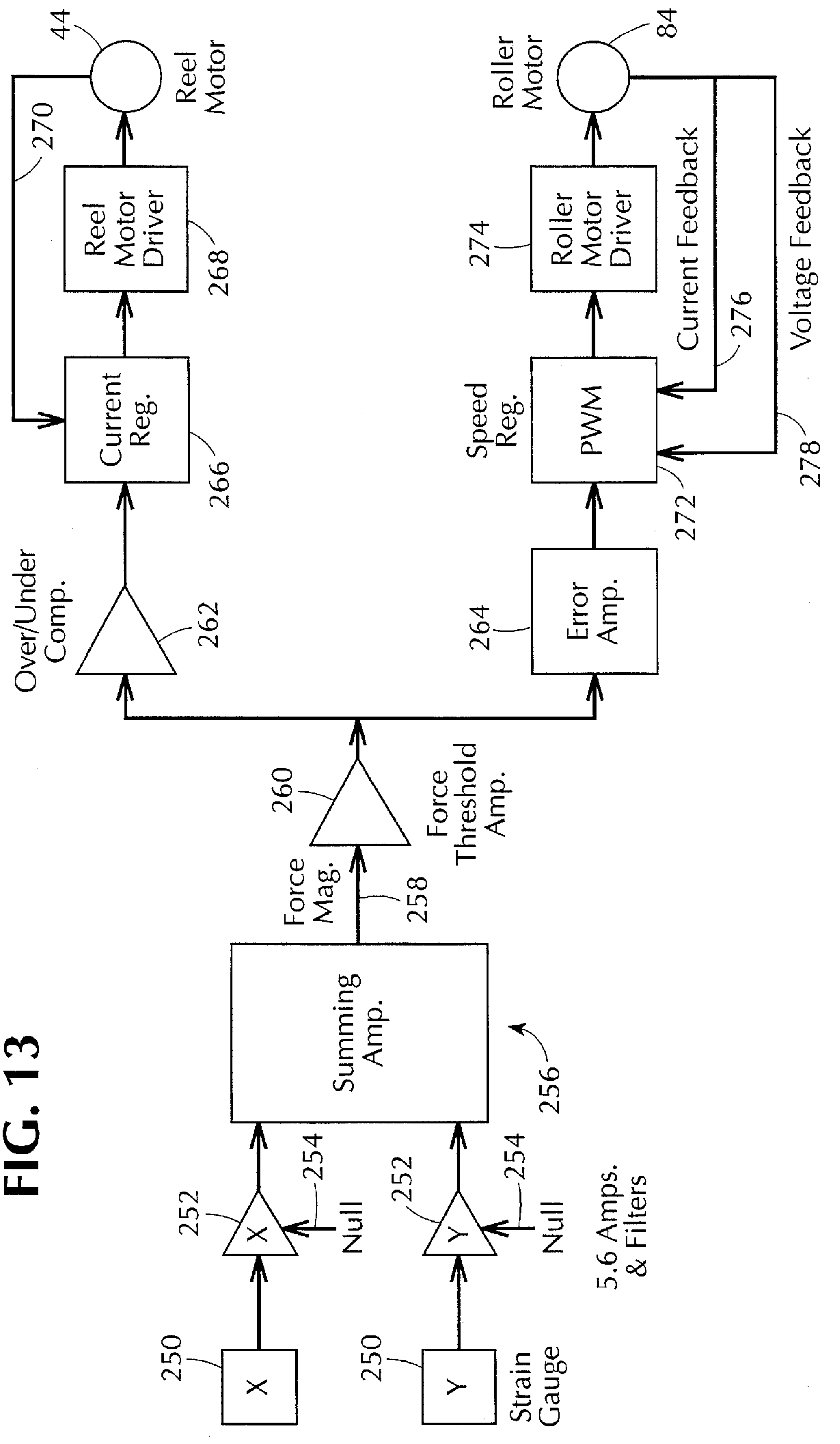
FIG. 13 is an electronic block diagram of the circuitry receiving signals from the cable strain sensor assembly and for controlling the reel drive motor (driving the cable reel) and roller drive motors which drive rollers from which the cable is deployed and/or retrieved.
Figure 15:
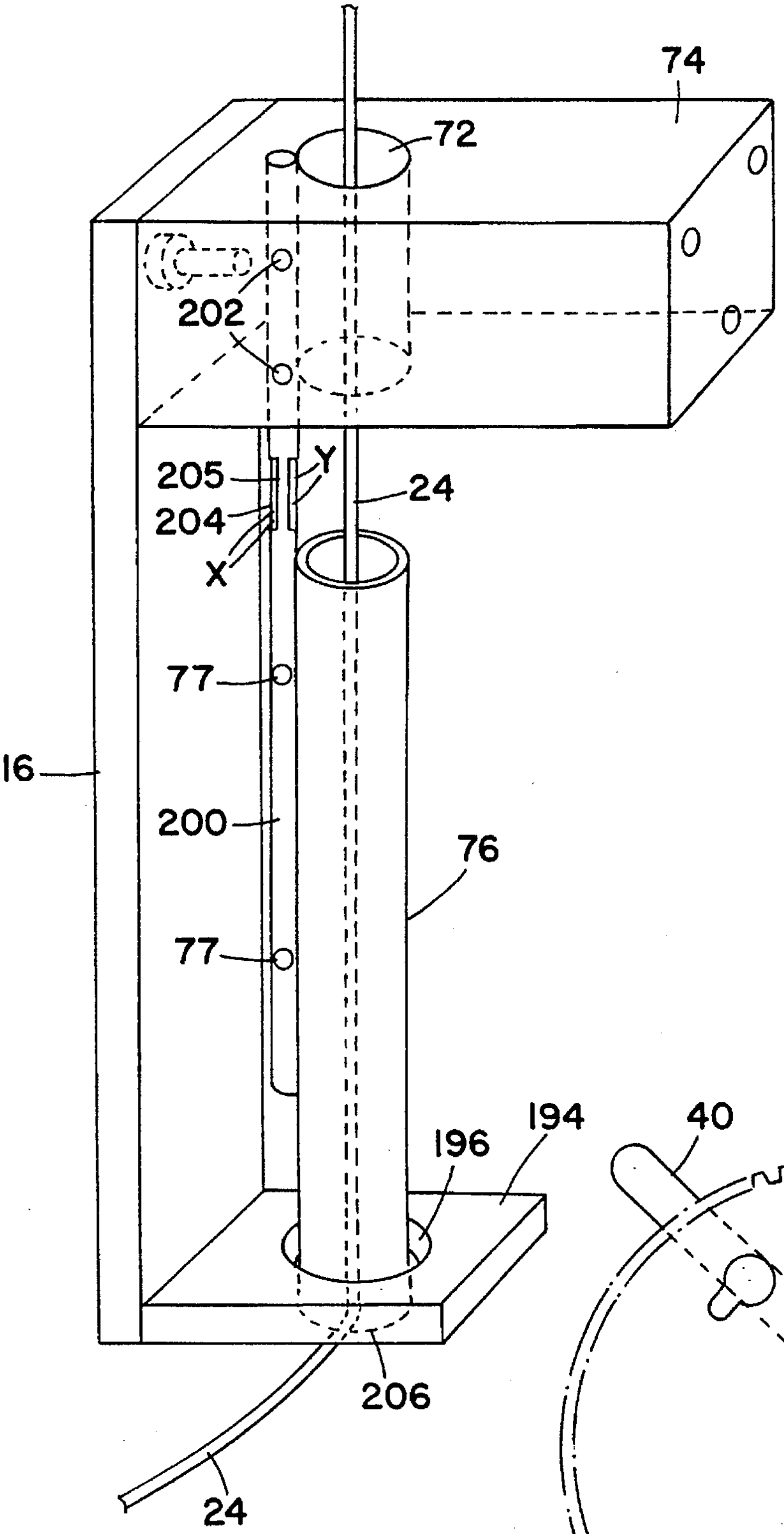
FIG. 15 is a perspective view of the cable strain sensor assembly of the cable deployment and retrieval system showing details of the deployed cable exit tube as well as the strain gauge assembly and the manner of attaching the strain gauge assembly to the device frame;.
Figure 14:
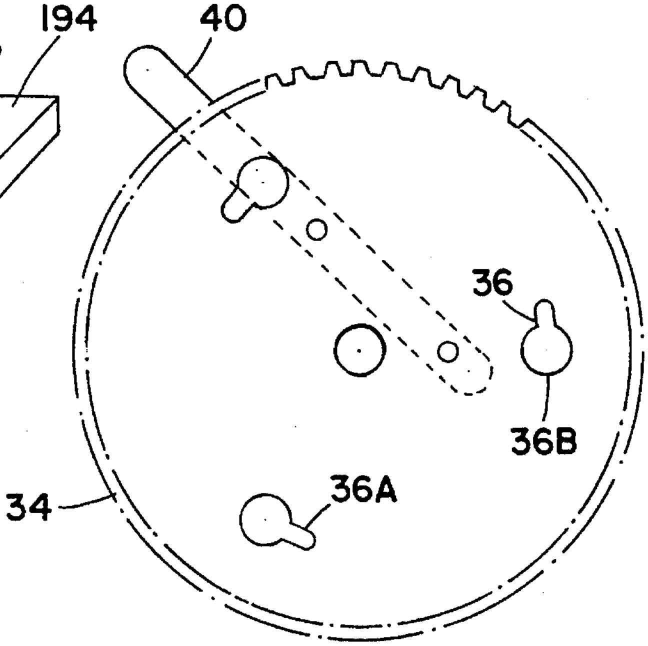
FIG. 14 is a plan view of the cable reel attaching gear plate.

FIG. 13 shows a block diagram of the electronic control circuitry of the present invention. The resistance signals from the two balanced bridges of the strain gauge circuit are shown at 250 as X and Y. Generally, one of the strain gauge resistances is disposed in a longitudinal direction along the strain gauge rod 200 and the other resistance for the other balanced bridge is disposed at an angle to the longitudinal direction. The two signals X and Y are supplied to strain gauge amplifiers and filters 252. Amplifier/filters 252 incorporate null adjustments 254 which are coupled to potentiometers 32A and 32B. See FIG. 1. A switch 30 (see FIG. 1) is provided which can be switched between "null" and "run" positions. Prior to use, the switch is flipped to the null position, at which a null reference level is determined when the cable 24 touches the bottom inner edge of the tubular conduit 76 with the desired reference tension. The null point determines the reference point above which point greater strain is detected and below which point a lesser strain is detected. For example, if the cable 24 presses against the tubular conduit 76 with greater force, a greater strain will be detected by the strain gauge elements 204. If the cable presses against the conduit 76 with a lesser force, or does not touch it at all, a lesser or no strain will be detected by the strain gauge elements 204. Once the null point has been set, the switch 30 is placed back into the "run" position, in which case the device is ready for use.

The outputs of the strain gauge amplifier/filters 254 are fed to a summing amplifier 256 which generate the absolute value of each of the input signals and adds the signals together to produce a force magnitude signal 258. The output of the summing amplifier 256 is provided to a force threshold amplifier 260, preferably at which a threshold value above the null point is set to provide an amount of tension, as minute as necessary, in the cable at all times. Preferably the system control circuitry is set up so that the system is biased toward take-up, i.e., the system is biased so that the reel 22 and rollers 62 and 64 (see below) will turn to take-up cable 24 whenever the magnitude of the force detected is below the threshold value (but above null) set in the force threshold amplifier 260. Thus, if the force threshold is set slightly above the null point, as long as the tension detected is below the force threshold but above the null point, the rollers 62 and 64 and reel 22 will turn to take-up cable and thus maintain the threshold tension in the cable at exit hole 206. The roller drive motor 84 will stop when the threshold is reached. The reel drive motor will also stop when the threshold is reached. As explained below, the reel motor 44 maintains a preset tension in cable 24 between the reel 22 and the roller 62 and 64 during take-up of the cable.

The output of the force threshold amplifier 200 is provided to under/over comparator 262 and to an error amplifier 264. The comparator 262 output is coupled to a current regulator 266 whose output is coupled to a reel motor driver 268 which controls the reel motor 44. The reel motor 44 provides current feedback via line 270 to the current regulator 266 to maintain the reel motor speed at the required rate.

Preferably, the reel motor 44 is operated such that it turns in only one direction, i.e., so as to retrieve cable 24. When cable is being retrieved, the reel motor 44 is turned on by the current regulator 266 in response to the threshold amplifier 260 so long as the tension in the cable 24 is below the force threshold set by the force threshold amplifier 260. The reel motor 44 will seek to maintain a degree of tension in cable 24 between the reel 22 and the roller 62 and 64 during take-up of the cable.

To deploy cable, the reel motor is turned off and the turning drive rollers 62 and 64 only pull cable 24 off the reel 24. The reel 22 will, of course, turn against the braking action provided by the transmissions 46, gear 116 and transmission 118. This braking action will prevent overshoot of the reel when the drive rollers stop or reverse direction.

The output of the force threshold amplifier 260 is also fed to error amplifier 264. The error amplifier 264 provides a positive or negative error signal, dependent on the tension in the cable 24, which is fed to a pulse width modulator speed regulator 272 which drives a roller motor driver circuit 274. Driver 274, in turn, drives the roller motor 84. Current feedback 276 and voltage feedback 278 are provided. The voltage feedback 278 provides stability and damps out oscillations. The current feedback 276 maintains the speed of the roller drive motor 84 at the required rate, dependent on the sensed strain in the cable at the exit hole 206. If the strain increases, the sensed roller drive motor current will increase, thereby causing the speed regulator 272 to drive the roller drive motor faster to pay out cable until the tension in the cable is driven back to the force threshold. Once the force threshold is achieved, the speed regulator maintains the current drawn by the roller motor at the required level to maintain the threshold.

Conversely, if the strain in the cable 24 at exit hole 206 decreases as sensed by the strain gauge, the current regulator 266 will cause the reel motor 44 to turn on to take-up cable 24. The current feedback 270 will regulate the current regulator 266 so as to drive the reel motor against a defined torque which is created by the tension in the cable between the reel 22 and the drive rollers 62 and 64. The current regulator maintains a preset tension in the cable between these points to prevent any slack between these points in the cable. At the same time, the error amplifier 264 will determine that the tension is below the force threshold, and it will reverse the roller motor 84 to cause it also to take-up cable. The speed at which the roller motor 84 turns will be determined by the current feedback circuit 276. The desired roller motor drive current will be that current which causes the tension in the cable 24 to increase toward and maintain the force threshold amount of tension.

As is evident from the above, in the preferred embodiment, the spool motor turns in only one direction so as to take-up cable. The roller motor 84 must be able to turn in both directions so as to take-up cable and so as to play out cable. As would be obvious to persons of skill in the art, the invention could be operated so that the reel motor 44 also turns in both directions. In the preferred embodiment, the invention uses DC motors for the roller and reel motors, but as would be obvious to persons of skill in the art, other type motors, for example, AC motors, could be used with suitable control circuitry. For example, AC motors may be used if power is obtained remotely for the device from an AC network, or AC motors could be used even if batteries supply power if suitable DC to AC conversion circuitry is employed, as known to those of skill in the art. In the preferred embodiment of the invention, the reel motor 44 and drive roller motor 84 are reversible, variable speed motors (although motor 44 is operated in only one direction in the preferred embodiment).

Additionally, as described, certain purely mechanical mechanisms described herein, e.g. the level wind flaker assembly driving mechanism, could be substituted by electronic circuits receiving signals proportional to reel 22 speed and an electric motor controlled by these circuits so as to traverse the required distance for each reel revolution.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. Apparatus adapted to be mounted on a mobile vehicle for deploying and retrieving cable from the vehicle into the environment external to the vehicle comprising:

a frame for mounting to the vehicle;

receiving means on the frame adapted to receive a cable storage reel having cable wound thereon for rotatable motion, the cable having a first end near the center of the reel, a wound portion of cable on the reel and an unwound portion of cable that extends from the reel;

coupling means for coupling the first end of the cable to the vehicle;

feeding means for feeding the cable on and off the cable storage reel;

guiding means including a cable exit area for guiding the unwound cable from the vehicle into the environment in any direction defined by a 360° arc around the cable exit area;

sensing means for sensing the tension in the unwound cable in any direction defined by the 360° arc around the cable exit area; and controlling means coupled to the sensing means receiving a signal from the sensing means related to the tension in the unwound cable for bi-directionally controlling said feeding means so as to maintain a preset tension in the unwound cable.

2. The apparatus recited in claim 1 wherein the preset tension comprises substantially zero tension.

3. The apparatus recited in claim 1, wherein said coupling means for coupling the first end of the cable to the vehicle comprises a rotating joint for providing communication between the cable wound on said reel and the vehicle.

4. The apparatus recited in claim 3, wherein the rotating joint comprises means for providing at least one of electrical and fiber optic communication with said cable on said cable reel.

5. The apparatus recited in claim 3, further comprising releasable engaging means for mounting said cable reel to said drive means and to said rotating joint.

6. The apparatus recited in claim 3, further comprising a hinged conduit supporting said rotating joint and for guiding cable connected to said rotating joint to the vehicle.

7. The apparatus recited in claim 6, wherein the hinged conduit is pivotable about a hinge point so as to swing away from said cable reel to allow loading of said cable reel.

8. The apparatus recited in claim 1, wherein the sensing means comprises a strain gauge for generating a signal related to the amount of tension in the cable.

9. The apparatus recited in claim 8, wherein the sensing means for sensing further comprises:

a member having an exit opening defining the exit area for the cable, the opening having a perimeter, the cable being provided through the opening so that it can come into contact with the perimeter of the opening over 360° of the perimeter of the opening;

said cable thereby exerting a force on the perimeter of the opening related to the tension in the cable, the strain gauge being coupled to the member having the exit opening and providing a signal related to the force applied and thereby to the tension in the cable.

10. The apparatus recited in claim 9, wherein the member having the exit opening comprises a tubular conduit, said tubular conduit being coupled to said strain gauge.

11. The apparatus recited in claim 10, wherein said tubular conduit moves when said cable applies a force thereto, thereby flexing said strain gauge and generating a signal related to the tension in the cable.

12. The apparatus recited in claim 11, further comprising electronic means for amplifying any minute signal generated by the strain gauge.

13. The apparatus recited in claim 11, further comprising means for limiting movement of said tubular conduit.

14. The apparatus recited in claim 13, wherein said means for limiting movement comprises a plate having an opening larger than an outside diameter of the tubular conduit with the tubular conduit extending through said plate opening, and thereby defining a clearance between an inner surface of said plate opening and said tubular conduit.

15. The apparatus recited in claim 14, further comprising a fixed mounting support mounted to said frame, the strain gauge being coupled between said mounting support and said tubular conduit.

16. The apparatus recited in claim 15, further comprising a bracket fastened to said mounting support and extending downwardly adjacent said strain gauge and tubular conduit and being fastened to said plate having said opening larger than the outside diameter of said tubular conduit, thereby securing said plate in position around said tubular conduit.

17. The apparatus recited in claim 8, wherein the feeding means for feeding cable on and off the cable storage reel comprises:

a drive means comprising a drive motor for driving the cable storage reel in rotation; and a pair of drive rollers for receiving the cable from the storage reel between surfaces of the rollers, at least one of the rollers being driven by a roller drive motor.

18. The apparatus recited in claim 17, wherein the controlling means comprises:

circuit means electrically coupled to the strain gauge for controlling the rotation of the drive means and for controlling the rotation of the drive rollers so as to maintain the preset tension in the unwound cable.

19. The apparatus recited in claim 17, further comprising a reducing transmission between said drive means and said means adapted to receive the cable reel, and further comprising a reducing transmission between said roller drive motor and at least one of said drive rollers.

20. The apparatus recited in claim 17, wherein one of said drive rollers is pivotable against a tension force to bias the pivotable drive roller against said other drive roller and to allow insertion of the cable between the drive rollers.

21. The apparatus recited in claim 20, further comprising means for centralizing the cable through the drive rollers.

22. The apparatus recited in claim 21, wherein the centralizing means comprises a centralizing loop.

23. The apparatus recited in claim 17, wherein the cable reel drive means is turned on only to retrieve cable and is not turned on when cable is deployed.

24. The apparatus recited in claim 23, wherein the roller drive motor is bi-directional so as to turn in a first direction to deploy cable and to turn in a second opposite direction to retrieve cable.

25. The apparatus recited in claim 23, wherein the cable reel drive means is controlled so as to maintain a prescribed tension in the cable between the cable reel and the drive rollers during cable retrieval.

26. The apparatus recited in claim 17, further comprising means for guiding said cable onto said cable reel so as to achieve a level wind of said cable on the cable reel.

27. The apparatus recited in claim 26, wherein said guiding means comprises a cable guide reciprocally movable across the width of said cable reel.

28. The apparatus recited in claim 27, wherein said guiding means further comprises:

a camshaft;

a lever arm having first and second ends, the first end coupled to said cable guide; the lever arm pivoting about an intermediate pivot point, the second end of said lever arm being coupled to said camshaft, said camshaft comprising a continuous bi-directional thread;

said camshaft being rotated by said drive means.

29. The apparatus recited in claim 28, further comprising a cam follower engaging said camshaft and coupled to said lever arm at said second end, thereby causing said lever arm to reciprocate back and forth along said camshaft about said intermediate pivot point as said cam follower follows the bi-directional thread.

30. The apparatus recited in claim 28, further comprising a reducing transmission between said drive means and said camshaft.

31. The apparatus recited in claim 28, wherein the lever arm is coupled to the flaking loop at the first end through a slotted slidable joint and the lever arm is coupled to the cam follower at the second end through a slotted slidable joint.

32. The apparatus recited in claim 28, wherein the intermediate pivot point of the lever arm is adjustable to accommodate cable reels of varying widths.

33. The apparatus recited in claim 32, wherein the pivot point is adjustable along two axes to accommodate varying cable reel widths and to maintain a fixed starting point against a cable reel flange regardless of cable reel width.

34. A method for deploying and retrieving cable from a mobile vehicle into the environment external to the vehicle comprising:

mounting a cable storage reel for rotatable motion on a frame coupled to the vehicle, the cable having a first end near the center of the reel, a wound portion of cable on the reel and an unwound portion of cable that extends from the reel;

coupling the first end of the cable to the vehicle;

feeding cable on and off the cable storage reel;

guiding the unwound cable from the vehicle from a cable exit area into the environment in any direction defined by a 360° arc around the cable exit area;

sensing the tension in the unwound cable in any direction defined by the 360° arc around the cable exit area; and receiving a signal related to the tension in the unwound cable and bi-directionally controlling said feeding on and off of cable so as to maintain a preset tension in the unwound cable.

35. The method recited in claim 34 wherein the preset tension comprises substanitally zero tension.

36. The method recited in claim 34, wherein said step of coupling the first end of the cable to the vehicle comprises providing a rotating joint for providing communication between the cable wound on said reel and the vehicle.

37. The method recited in claim 34, further comprising guiding said cable onto said cable reel so as to achieve a level wind of said cable on the cable reel.

38. The method recited in claim 37, wherein said step of guiding comprises reciprocally moving a cable guide across the width of said cable reel.

39. The method recited in claim 34, wherein the step of sensing comprises using a strain gauge to generate a signal related to the amount of tension in the cable.

40. The method recited in claim 39, wherein the step of sensing further comprises:

providing a member having an exit opening defining the cable exit area for the cable, the opening having a perimeter, the cable being provided through the opening so that it can come into contact with the perimeter of the opening over 360° of the perimeter of the opening;

said cable thereby exerting a force on the perimeter of the opening related to the tension in the cable, the strain gauge being coupled to the member having the exit opening and providing a signal related to the force applied and thereby to the tension in the cable.

41. The method recited in claim 40, further comprising applying a force with said cable due to movement of the vehicle to the member having the exit opening to move said member, thereby flexing said strain gauge and generating a signal related to the tension in the cable.

42. The method recited in claim 41, further comprising electronically amplifying any minute signal generated by the strain gauge.

43. The method recited in claim 41, further comprising limiting movement of said member having the exit opening.

44. The method recited in claim 43, further comprising mounting said strain gauge between said frame and said member having the exit opening.

45. The method recited in claim 39, wherein the step of feeding cable on and off the cable storage reel comprises:

driving the cable storage reel in rotation; and receiving the cable from the storage reel between surfaces of two drive rollers.

46. The method recited in claim 45, wherein the step of controlling comprises:

controlling the rotation of the cable storage reel and controlling the rotation of the drive rollers so as to maintain the preset tension or no tension in the cable.

47. The method recited in claim 45, further comprising centralizing the cable through the drive rollers.

48. The method recited in claim 45, further comprising providing a drive means for the cable reel and turning on the drive means for the cable reel only to retrieve cable.

49. The method recited in claim 48, further comprising providing a hi-directional drive means for the drive rollers and turning the drive rollers in a first direction to deploy cable and turning the drive rollers in a second opposite direction to retrieve cable.

50. The method recited in claim 48, further comprising controlling the cable reel drive means so as to maintain a prescribed tension in the cable between the cable reel and the drive rollers during cable retrieval.

51. Apparatus adapted to be mounted on a mobile vehicle for deploying and retrieving cable from the vehicle into the environment external to the vehicle comprising:

a frame for mounting to the vehicle;

a reel rotating member mounted on the frame adapted to receive a cable storage reel having cable wound thereon for rotatable motion, the cable having a first end near the center of the reel, a wound portion of cable on the reel and an unwound portion of cable that extends from the reel;

a rotating joint for coupling the first end of the cable to the vehicle;

a first drive motor for feeding the cable the on and off the cable storage reel;

a cable exit opening for guiding the unwound cable from the vehicle into the environment in any direction defined by a 360° arc around the cable exit opening;

a sensor sensing the tension in the unwound cable in any direction defined by the 360° arc around the cable exit opening; and an electronic circuit coupled to the sensor receiving a signal from the sensor related to the tension in the unwound cable for bi-directionally controlling said drive motor so as to maintain a preset tension in the unwound cable.

52. The apparatus recited in claim 51 wherein the preset tension comprises substantially zero tension.

53. The apparatus recited in claim 51, further comprising a guiding member for laying said cable onto said cable reel so as to achieve a level wind of said cable on the cable reel.

54. The apparatus recited in claim 53, wherein said guiding member comprises a cable guide reciprocally movable across the width of said cable reel.

55. The apparatus recited in claim 54, wherein said guiding member further comprises:

a camshaft;

a lever arm having first and second ends, the first end coupled to said cable guide; the lever arm pivoting about an intermediate pivot point, the second end of said lever arm being coupled to said camshaft, said camshaft comprising a continuous bi-directional thread;

said camshaft being rotated by said second drive motor.

56. The apparatus recited in claim 55, further comprising a cam follower engaging said camshaft and coupled to said lever arm at said second end, thereby causing said lever arm to reciprocate back and forth along said camshaft about said intermediate pivot point as said cam follower follows the bi-directional thread.

57. The apparatus recited in claim 55, further comprising a reducing transmission between said second drive motor and said camshaft.

58. The apparatus recited in claim 55, wherein the intermediate pivot point of the lever arm is adjustable to accommodate cable reels of varying widths.

59. The apparatus recited in claim 58, wherein the lever arm is coupled to the flaking loop at the first end through a slotted slidable joint and the lever arm is coupled to the cam follower at the second end through a slotted slidable joint.

60. The apparatus recited in claim 58, wherein the pivot point is adjustable along two axes to accommodate varying cable reel widths and to maintain a fixed starting point against a cable reel flange regardless of cable reel width.

61. The apparatus recited in claim 51, wherein the sensor comprises a strain gauge for generating a signal related to the amount of tension in the cable.

62. The apparatus recited in claim 61, wherein the cable exit opening comprises:

a member having said exit opening defining an exit area for the cable, the opening having a perimeter, the cable being provided through the opening so that it can come into contact with the perimeter of the opening over 360° of the perimeter of the opening;

said cable thereby exerting a force on the perimeter of the opening related to the tension in the cable, the strain gauge being coupled to the member having the exit opening and providing a signal related to the force applied and thereby to the tension in the cable.

63. The apparatus recited in claim 62, wherein the member having the exit opening comprises a tubular conduit, said tubular conduit being coupled to said strain gauge.

64. The apparatus recited in claim 63, wherein said tubular conduit moves when said cable applies a force thereto, thereby flexing said strain gauge and generating a signal related to the tension in the cable.

65. The apparatus recited in claim 64, wherein said electronic circuit comprises an amplifier for amplifying any minute signal generated by the strain gauge.

66. The apparatus recited in claim 64, further comprising a member limiting movement of said tubular conduit.

67. The apparatus recited in claim 66, wherein said member limiting movement comprises a plate having an opening larger than an outside diameter of the tubular conduit with the tubular conduit extending through said plate opening, and thereby defining a clearance between an inner surface of said plate opening and said tubular conduit.

68. The apparatus recited in claim 67, further comprising a fixed mounting support mounted to said frame, the strain gauge being coupled between said mounting support and said tubular conduit.

69. The apparatus recited in claim 68, further comprising a bracket fastened to said mounting support and extending downwardly adjacent said strain gauge and tubular conduit and being fastened to said plate having said opening larger than the outside diameter of said tubular conduit, thereby securing said plate in position around said tubular conduit.

70. The apparatus recited in claim 61, further comprising:

a second drive motor for driving the cable storage reel in rotation; and a pair of drive rollers for receiving the cable from the storage reel between surfaces of the rollers, at least one of the rollers driven by said first drive motor.

71. The apparatus recited in claim 70, further comprising a reducing transmission between said second drive motor and said reel rotating member, and further comprising a reducing transmission between said first drive motor and at least one of said drive rollers.

72. The apparatus recited in claim 70, wherein the electronic circuit comprises:

a circuit electrically coupled to the strain gauge for controlling the rotation of the first drive motor, thereby controlling the rotation of the drive rollers so as to maintain the preset tension or no tension in the unwound cable.

73. The apparatus recited in claim 72, wherein the electronic circuit further controls the rotation of the second drive motor.

74. The apparatus recited in claim 70, wherein one of said drive rollers is pivotable against a tension force to bias the pivotable drive roller against said other drive roller and to allow insertion of the cable between the drive rollers.

75. The apparatus recited in claim 74, further comprising a centralizing member centering the cable through the drive rollers.

76. The apparatus recited in claim 75, wherein the centralizing member comprises a centralizing loop.

77. The apparatus recited in claim 70, wherein the second drive motor is turned on only to retrieve cable and is not turned on when cable is deployed.

78. The apparatus recited in claim 77, wherein the first drive motor is bi-directional so as to turn in a first direction to deploy cable and to turn in a second opposite direction to retrieve cable.

79. The apparatus recited in claim 77, wherein the second drive motor is controlled so as to maintain a prescribed tension in the cable between the cable reel and the drive rollers during cable retrieval.

80. The apparatus recited in claim 70, wherein said rotating joint provides communication between the cable wound on said reel and the vehicle.

81. The apparatus recited in claim 80, wherein the rotating joint provides electrical and/or fiber optic communication with said cable on said cable reel.

82. The apparatus recited in claim 80, further comprising releasable engaging fasteners for mounting said cable reel to said second drive motor and to said rotating joint.

83. The apparatus recited in claim 80, further comprising a hinged conduit supporting said rotating joint and guiding cable connected to said rotating joint to the vehicle.

84. The apparatus recited in claim 83, wherein the hinged conduit is pivotable about a hinge point so as to swing away from said cable reel to allow loading of said cable reel.

* * * * *